US012638658B2

(12) United States Patent (10) Patent No.: US 12,638,658 B2
Jeong et al. (45) Date of Patent: May 26, 2026

(54) OPTICAL IMAGING SYSTEM

(71) Applicant: SAMSUNG ELECTRO-MECHANICS CO., LTD., Suwon-si (KR)

(72) Inventors: You Jin Jeong, Suwon-si (KR); Jae Hyuk Huh, Suwon-si (KR); Byung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 797 days.

(21) Appl. No.: 17/946,520

(22) Filed: Sep. 16, 2022

(65) Prior Publication Data

US 2023/0375807 A1 Nov. 23, 2023

(30) Foreign Application Priority Data

May 20, 2022 (KR) ......................... 10-2022-0062197

(51) Int. Cl.
*G02B 13/00* (2006.01)
(52) U.S. Cl.
CPC ..... *G02B 13/0045* (2013.01); *G02B 13/0065* (2013.01)
(58) Field of Classification Search
CPC ........... G02B 13/0065; G02B 13/0045; G02B 13/0015; G02B 13/16; G02B 13/18; G02B 9/62; G02B 9/64; G02B 27/0025; G02B 27/0012; G02B 27/0172; G02B 15/146; H04N 5/222; H04N 5/2254
USPC ........ 359/656–658, 708, 713, 749, 756–762, 359/793
See application file for complete search history.

(56) References Cited

U.S. PATENT DOCUMENTS

| | | | |
|---|---|---|---|
| 7,830,621 B2 | 11/2010 | Jeong et al. | |
| 2015/0138425 A1* | 5/2015 | Lee | G02B 9/62 |
| | | | 348/335 |
| 2019/0391367 A1* | 12/2019 | Kuo | G02B 9/62 |
| 2021/0116682 A1 | 4/2021 | Smolka et al. | |
| 2022/0268971 A1 | 8/2022 | Lim et al. | |
| 2022/0382020 A1 | 12/2022 | Kwon | |
| 2022/0404634 A1 | 12/2022 | Jo et al. | |

FOREIGN PATENT DOCUMENTS

| | | | | |
|---|---|---|---|---|
| CN | 108732728 A | 11/2018 | | |
| CN | 110275279 A | 9/2019 | | |
| CN | 110708447 A | 1/2020 | | |
| CN | 113219628 A | 8/2021 | | |
| CN | 113885184 A | * 1/2022 | ..... | G02B 15/145113 |
| CN | 114047610 A | 2/2022 | | |

(Continued)

OTHER PUBLICATIONS

Translation of CN113885184 (Year: 2022).*

(Continued)

*Primary Examiner* — Travis S Fissel
(74) *Attorney, Agent, or Firm* — NSIP Law

(57) ABSTRACT

An optical imaging system includes a fixed-focus lens group and a variable-focus lens group disposed in this order from an object side, wherein the fixed-focus lens group includes a first lens, a second lens, and a third lens disposed in this order from an object side, wherein the first lens has positive refractive power, and wherein the second lens has negative refractive power.

15 Claims, 9 Drawing Sheets

(56) References Cited

FOREIGN PATENT DOCUMENTS

| | | | |
|---|---|---|---|
| CN | 215813521 | U | 2/2022 |
| CN | 216310394 | U | 4/2022 |
| JP | 2008-172682 | A | 7/2008 |
| JP | 2020-101736 | A | 7/2020 |
| KR | 10-2021-0041909 | A | 4/2021 |
| KR | 10-2021-0099915 | A | 8/2021 |
| TW | M410223 | U1 | 8/2011 |

OTHER PUBLICATIONS

Korean Office Action issued on Aug. 2, 2024, in counterpart Korean Patent Application No. 10-2022-0062197 (8 pages in English, 7 pages in Korean).

Taiwanese Office Action issued on Oct. 4, 2023, in counterpart Taiwanese Patent Application No. 111136208 (4 pages in English, 4 pages in Chinese).

Korean Office Action Issued on Apr. 23, 2025, in Corresponding Korean Patent Application No. 10-2022-0062197 (5 pages in English, 5 pages in Korean).

Chinese Office Action Issued on May 28, 2025, in Corresponding Chinese Patent Application No. 202211471265.0 (7 pages in English, 10 pages in Chinese).

* cited by examiner

VL

LQ1 }
LQ } LQ
LQ2 }

CG

Sq1

Sq2          Sq4

Sq3          Sq5

10

20    30    IF  IP  IS

P        FLG      VLG 100, 200, 300, 400 ⋯ 1200

OPTICAL IMAGING SYSTEM

CROSS-REFERENCE TO RELATED APPLICATIONS

This application claims the benefit under 35 USC 119(a) of Korean Patent Application No. 10-2022-0062197 filed on May 20, 2022, in the Korean Intellectual Property Office, the entire disclosure of which is incorporated herein by reference for all purposes.

BACKGROUND

1. Field

Embodiments of the present disclosure relate to an optical imaging system including a variable-focus lens configured to have an adjustable focal length.

2. Description of the Background

A camera module may include an optical imaging system. An optical imaging system of a camera module may have a predetermined focal length. For example, a focal length of an optical imaging system may be determined by lenses included in the optical imaging system. The camera module may be configured to adjust through autofocusing (AF) a focal length of an optical imaging system for clear imaging. For example, a camera module may adjust a focal length of a camera module by moving an optical imaging system in an optical axis direction. However, since the camera module having the above-described structure is configured to have a considerable size to move the optical imaging system in the optical axis direction, it may be difficult to reduce a size and weight thereof.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a fixed-focus lens group and a variable-focus lens group disposed in this order from an object side, wherein the fixed-focus lens group includes a first lens, a second lens, and a third lens disposed in this order from an object side, wherein the first lens has positive refractive power, and wherein the second lens has negative refractive power.

The first lens may have a convex object-side surface.

The second lens may have a concave image-side surface.

The third lens may have a convex object-side surface.

The optical imaging system may further include an optical path changing element disposed on an object side of the fixed-focus lens group or between lenses of the fixed-focus lens group.

The optical imaging system may further include a fourth lens disposed on an image side of the third lens.

the fourth lens may have a concave image-side surface.

The optical imaging system may further include a fifth lens disposed on an image side of the fourth lens.

The optical imaging system may further include a sixth lens disposed on an image side of the fifth lens.

At least one of conditional expressions as below may be satisfied:

$$2.0 < TTL/f1 < 4.0, \text{ and}$$

$$5.0 < TTL/f2 < -0.2,$$

where TTL is a distance from an object-side surface of the first lens to an imaging plane of the optical imaging system, f1 is a focal length of the first lens, and f2 is a focal length of the second lens.

A conditional expression as below may be satisfied:

$$25 < V1 - V2,$$

where V1 is an Abbe number of the first lens, and V2 is an Abbe number of the second lens.

A camera module may include a housing and the optical imaging system disposed in the housing.

In another general aspect, an optical imaging system includes a fixed-focus lens group, and a variable-focus lens group disposed on an image side of the fixed-focus lens group, wherein the fixed-focus lens group includes a first lens, a second lens, a third lens, and a fourth lens disposed in this order from an object side, and wherein a conditional expression as below is satisfied:

$$0.8 < TTL/f < 1.0,$$

where TTL is a distance from an object-side surface of the first lens to an imaging plane of the optical imaging system, and f is a focal length of the optical imaging system.

A conditional expression as below may be satisfied:

$$28.0 \text{ mm} < fA < 36.0 \text{ mm},$$

where fA is a focal length of the fixed-focus lens group.

A conditional expression as below may be satisfied:

$$-600 \text{ mm} < fB < 20.0 \text{ mm},$$

where fB is a focal length of the variable-focus lens group.

In another general aspect, an optical imaging system includes a fixed-focus lens group and a variable-focus lens group disposed in this order from an object side, wherein the fixed-focus lens group includes a first lens, a second lens, and a third lens disposed in this order from an object side, and wherein at least one of conditional expressions as below is satisfied:

$$28.0 \text{ mm} < fA < 36.0 \text{ mm}, \text{ and}$$

$$-600 \text{ mm} < fB < 20.0 \text{ mm},$$

where fA is a focal length of the fixed-focus lens group and fB is a focal length of the variable-focus lens group.

The first lens may have positive refractive power, and the second lens may have negative refractive power.

A camera module may include a housing, the optical imaging system disposed in the housing, and an energy generator configured to supply energy to operate the variable-focus lens group.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
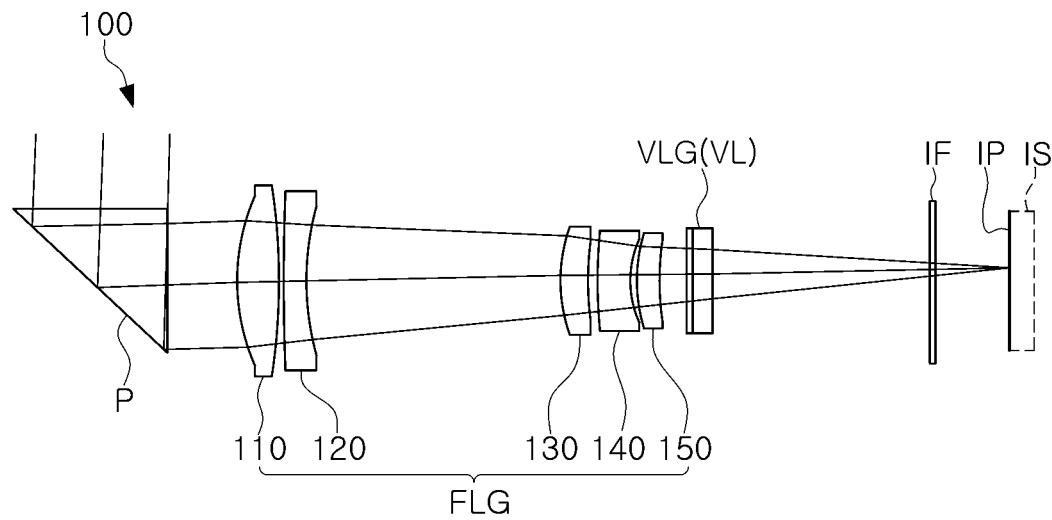
FIG. 1 is a diagram illustrating an optical imaging system according to a first embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

One or more embodiments of the present disclosure provide an optical imaging system which may have a reduced size and weight.

In the embodiments, a first lens refers to a lens most adjacent to an object (or a subject), and a sixth lens refers to a lens most adjacent to an imaging plane (or an image sensor) when there are six lenses. In the embodiments, a unit of a radius of curvature, a thickness, a TTL (a distance from an object-side surface of the first lens to an imaging plane), an ImgH (a height of an imaging plane), a focal length, and an effective diameter are indicated in millimeters (mm). A thickness of a lens, a gap between lenses, and a TTL may be calculated with respect to an optical axis. Also, in the descriptions of a shape of a lens, a configuration in which one surface is convex indicates that an optical axis of the surface is convex, while a configuration in which one surface is concave indicates that an optical axis of the surface is concave. Thus, even when it is described that one surface of a lens is convex, an edge of the lens may be concave. Similarly, even when it is described that one surface of a lens is concave, an edge of the lens may be convex.

The optical imaging system described in embodiments may be configured to be mounted on a transportation device. For example, the optical imaging system may be mounted on a smartphone, a laptop computer, an augmented reality device, a virtual reality device (VR), a portable game machine, and the like. However, the embodiments of the optical imaging system are not limited to the above-described examples. For example, the optical imaging system may be mounted on an electronic device providing a narrow mounting space, but requiring high-resolution imaging.

The optical imaging system described in embodiments may include a fixed-focus lens group and a variable-focus lens group disposed in this order from an object side. In the optical imaging system according to one or more embodiments, the fixed-focus lens group may include a plurality of lenses. For example, the fixed-focus lens group may include a first lens, a second lens, and a third lens disposed in this order from an object side. However, the configuration of the fixed-focus lens group is not limited to three lenses. For example, the fixed-focus lens group may further include a fourth lens disposed on an image-side surface of the third lens. As another example, the fixed-focus lens group may further include a fifth lens disposed on image-side surface of the fourth lens together with the fourth lens. As another example, the fixed-focus lens group may further include a sixth lens disposed on an image-side surface of the fifth lens together with the fourth and fifth lenses. The optical imaging system according to the one or more embodiments may include a lens having positive refractive power. For example, in the fixed-focus lens group, the first lens may have positive refractive power. The optical imaging system according to the one or more embodiments may include a lens having negative refractive power. For example, in the fixed-focus lens group, the second lens may have negative refractive power.

The optical imaging system in the one or more embodiments may further include other optical elements if desired. For example, the optical imaging system according to the one or more embodiments may further include an optical path changing element. The optical path changing element may be configured in the form of a prism or a reflector. The optical path changing element may be disposed more adjacent to an object than the variable-focus lens group. For example, the optical path changing element may be disposed on an object side of the fixed-focus lens group. As another example, the optical path changing element may be disposed between lenses of the fixed-focus lens group.

The optical imaging system according to the one or more embodiments may include a fixed-focus lens group and a variable-focus lens group disposed in this order from an object side. In the optical imaging system according to the one or more embodiments, the fixed-focus lens group may include a plurality of lenses. For example, the fixed-focus lens group may include a first lens, a second lens, a third lens, and a fourth lens disposed in this order from an object side. However, the configuration of the fixed-focus lens group is not limited to four lenses. For example, the fixed-focus lens group may include five or more lenses if desired. The optical imaging system according to the one or more embodiments may satisfy a predetermined conditional expression. For example, the optical imaging system according to the one or more embodiments may satisfy conditional expressions as below with respect to TTL (a distance from an object-side surface of the first lens to an imaging plane) and f (a focal length of the optical imaging system).

$$0.8 < TTL/f < 1.0$$

The optical imaging system according to the one or more embodiments configured as above may enable an AF function of the camera module or a focus magnification adjustment function of the camera module through the variable-focus lens group.

In the optical imaging system according to the one or more embodiments, the variable-focus lens group may include a single liquid lens. However, the configuration of the variable-focus lens group is not limited to a single liquid lens. For example, the variable-focus lens group may include two or more liquid lenses. The liquid lens of the variable-focus lens group may have a predetermined Abbe number. For example, an Abbe number of the liquid lens may be 70 or more. As a specific example, an Abbe number of the liquid lens may be greater than 60 and less than 95. The liquid lens of the variable-focus lens group may have a predetermined refractive index. For example, a refractive index of the liquid lens may be less than 1.6. As a specific example, a refractive index of the liquid lens may be greater than 1.2 and less than 1.6.

The optical imaging system in the one or more embodiments may include a fixed-focus lens group and a variable-focus lens group, and may be configured to satisfy one or more conditional expressions. In the optical imaging system according to the one or more embodiments, the fixed-focus lens group may be disposed more adjacent to an object side than the variable-focus lens group. Also, the fixed-focus lens group may include a first lens, a second lens, a third lens, and a fourth lens disposed in this order from an object side.

For example, the optical imaging system according to the one or more embodiments may satisfy conditional expressions as follows.

$$28.0 \text{ mm} < fA < 36.0 \text{ mm}$$

$$-600 \text{ mm} < fB < 20.0 \text{ mm}$$

$$24.0 \text{ mm} < TTL < 32.0 \text{ mm}$$

$$2.0 < TTL/f1 < 4.0$$

$$-5.0 < TTL/f2 < -0.2$$

$$25 < V1 - V2$$

In the above conditional expressions, fA is the focal length of the fixed-focus lens group, fB is the focal length of the variable-focus lens group, TTL is the distance from an object side of a frontmost lens (the first lens of the fixed-focus lens group) to an imaging plane, f1 is the focal length of the first lens, f2 is the focal length of the second lens, V1 is the Abbe number of the first lens, and V2 is the Abbe number of the second lens.

The fixed-focus lens group of the optical imaging system according to the one or more embodiments may include one or more lenses having the characteristics as below if desired. For example, the fixed-focus lens group according to the one or more embodiments may include one of the first to sixth lenses according to the characteristics as below. However, the fixed-focus lens group described above may not necessarily include the lens according to the characteristics as below.

Hereinafter, the characteristics of the first to sixth lenses will be described.

The first lens may have predetermined refractive power. For example, the first lens may have positive refractive power. One surface of the first lens may be convex. For example, an object-side surface the first lens may be convex. The first lens may include a spherical surface or an aspherical surface. For example, both surfaces of the first lens may be spherical or aspherical. The first lens may be formed of a material having high light transmittance and excellent workability. For example, the first lens may be formed of a plastic material. However, the material of the first lens is not limited to a plastic material. For example, the first lens may be formed of a glass material. The first lens may have a predetermined refractive index. For example, the refractive index of the first lens may be greater than 1.5 and less than 1.6. The first lens may have a predetermined Abbe number. For example, the Abbe number of the first lens may be greater than 50 and less than 60.

The second lens may have refractive power. For example, the second lens may have negative refractive power. One surface of the second lens may be convex. For example, an object-side surface or an image-side surface of the second lens may be concave. The second lens may include a spherical surface or an aspherical surface. For example, both surfaces of the second lens may be spherical or aspherical. The second lens may be formed of a material having high light transmittance and excellent workability. For example, the second lens may be formed of a plastic material. However, the material of the second lens is not limited to a plastic material. For example, the second lens may be formed of a glass material. The second lens may have a predetermined refractive index. For example, the refractive index of the second lens may be greater than 1.6 and less than 1.7. The second lens may have a predetermined Abbe number. For example, the Abbe number of the second lens may be greater than 20 and less than 30.

The third lens may have refractive power. For example, the third lens may have positive or negative refractive power. One surface of the third lens may be convex. For example, an object-side surface of the third lens may be convex. The third lens may include a spherical surface or an aspherical surface. For example, both surfaces of the third lens may be spherical or aspherical. The third lens may be formed of a material having high light transmittance and excellent workability. For example, the third lens may be formed of a plastic material. However, the material of the third lens is not limited to the plastic material. For example, the third lens may be formed of a glass material. The third lens may have a predetermined refractive index. For example, the refractive index of the third lens may be greater than 1.5 and less than 1.6. The third lens may have a predetermined Abbe number. For example, the Abbe number of the second lens may be greater than 50 and less than 60.

The fourth lens may have refractive power. For example, the fourth lens may have positive or negative refractive power. One surface of the fourth lens may be concave or both surfaces thereof may be convex. For example, an image-side surface of the fourth lens may be concave or both surfaces thereof may be convex. The fourth lens may include a spherical surface or an aspherical surface. For example, both surfaces of the fourth lens may be spherical or aspherical. The fourth lens may be formed of a material having high light transmittance and excellent workability. For example, the fourth lens may be formed of a plastic material. However, the material of the fourth lens is not limited to a plastic material. The fourth lens may have a predetermined refractive index. For example, the refractive index of the fourth lens may be greater than 1.6 and less than 1.7. The fourth lens may have a predetermined Abbe number. For example, the Abbe number of the fourth lens may be greater than 16 and less than 30.

The fifth lens may have refractive power. For example, the fifth lens may have positive or negative refractive power. One surface of the fifth lens may be convex or both surfaces thereof may be concave. For example, an object-side surface of the fifth lens may be convex both surfaces thereof may be concave. The fifth lens may include a spherical surface or an aspherical surface. For example, both surfaces of the fifth lens may be spherical or aspherical. The fifth lens may be formed of a material having high light transmittance and excellent workability. For example, the fifth lens may be formed of a plastic material. However, the material of the fifth lens is not limited to a plastic material. The fifth lens may have a predetermined refractive index. For example, the refractive index of the fifth lens may be greater than 1.5 and less than 1.6. The fifth lens may have a predetermined Abbe number. For example, the Abbe number of the fifth lens may be greater than 50 and less than 60.

The sixth lens may have refractive power. For example, the sixth lens may have positive or negative refractive power. One surface of the sixth lens may be concave. For example, an image-side surface of the sixth lens may be concave. The sixth lens may include a spherical surface or an aspherical surface. For example, both surfaces of the sixth lens may be spherical or aspherical. The sixth lens may be formed of a material having high light transmittance and excellent workability. For example, the sixth lens may be formed of a plastic material. However, the material of the sixth lens is not limited to a plastic material. The sixth lens may have a predetermined refractive index. For example, the refractive index of the sixth lens may be greater than 1.5 and less than 1.6. The sixth lens may have a predetermined Abbe number. For example, the Abbe number of the sixth lens may be greater than 50 and less than 60.

The aspherical shape of the first to sixth lenses may be represented by Equation 1.

$$Z = \frac{cr^2}{1 + \sqrt{1 - (1+k)c^2r^2}} + Ar^4 + Br^6 +$$
$$Cr^8 + Dr^{10} + Er^{12} + Fr^{14} + Gr^{16} + Hr^{18} + Jr^{20}$$

<div align="right">Equation 1</div>

In Equation 1, c is the reciprocal of the radius of curvature of the corresponding lens, k is the conic constant, r is the distance from one point on the aspherical surface to the optical axis, A to H and J are aspherical constants, Z (or SAG) is the height from one point on the aspherical surface to the apex of the aspherical surface in the optical axis direction.

The optical imaging system may further include a filter. The filter may be disposed between the variable-focus lens group and an imaging plane. A filter may be configured to block light of a specific wavelength. For example, the filter may be configured to block infrared radiation. The optical imaging system may include an imaging plane. An imaging plane may be formed on the surface of the image sensor or in the image sensor.

Hereinafter, a specific embodiment of the optical imaging system will be described with reference to the drawings.

The optical imaging system according to a first embodiment will be described with reference to FIG. 1.

The optical imaging system 100 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 110, a second lens 120, a third lens 130, a fourth lens 140, and a fifth lens 150 disposed in this order from an object side. The first lens 110 may have positive refractive power, and may have a convex object-side surface and a convex image-side surface. The second lens 120 may have negative refractive power, and may have a convex object-side surface and a concave image-side surface. The third lens 130 may have positive refractive power, and may have a convex object-side surface and a concave image-side surface. The fourth lens 140 may have negative refractive power, and may have a convex object-side surface and a concave image-side surface. The fifth lens 150 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change (e.g., FIG. 13). The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 100 may further include a prism P, an optical path changing element. The prism P may be disposed in front (an object-side surface) of the fixed-focus lens group FLG. The optical imaging system 100 may include an imaging plane IP. In the embodiment, an imaging plane IP may be formed on the surface of the image sensor IS.

The optical imaging system 100 may further include a filter IF. The filter IF may be disposed between the variable-focus lens group VLG and an imaging plane IP.

Tables 1 and 2 list lens characteristics and aspheric coefficients of the optical imaging system according to the present embodiment.

TABLE 1

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.524 | | |
| S4 | First lens | 8.738 | 1.548 | 1.534 | 55.7 |
| S5 | | −31.095 | 0.213 | | |
| S6 | Second lens | 140.843 | 0.800 | 1.615 | 26.0 |
| S7 | | 11.250 | 9.350 | | |
| S8 | Third lens | 7.261 | 1.098 | 1.671 | 19.2 |
| S9 | | 19.869 | 0.300 | | |
| S10 | Fourth lens | 32.049 | 1.181 | 1.615 | 26.0 |
| S11 | | 4.391 | 0.249 | | |
| S12 | Fifth lens | 7.266 | 0.869 | 1.546 | 56.1 |
| S13 | | 13.124 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 8.000 | | |
| S18 | Filter | Infinity | 0.110 | 1.519 | 64.2 |
| S19 | | Infinity | 2.762 | | |
| S20 | Imaging Plane | Infinity | 0.001 | | |

TABLE 2

| Surface No. | S4 | S5 | S6 | S7 | S8 |
|---|---|---|---|---|---|
| K | −0.737 | −3.266 | −85.696 | 0.373 | 0.412 |
| A | 3.729E−05 | 1.439E−04 | −2.448E−04 | −4.430E−04 | −3.838E−04 |
| B | −1.321E−07 | −1.491E−06 | 8.942E−06 | 5.760E−06 | 6.445E−06 |
| C | −7.755E−08 | −1.191E−07 | 3.365E−08 | −4.768E−08 | −2.240E−07 |
| D | −6.543E−09 | −1.073E−08 | −3.468E−10 | 3.054E−08 | 1.833E−07 |
| E | −4.971E−10 | −1.027E−09 | −3.028E−11 | 2.042E−09 | 2.723E−08 |
| F | −3.133E−11 | −8.856E−11 | 1.123E−11 | 1.637E−10 | 4.713E−09 |
| G | −2.280E−12 | −6.240E−12 | 5.686E−13 | −7.687E−13 | 6.781E−10 |
| H | −2.110E−13 | −3.167E−13 | −5.776E−14 | −6.511E−13 | −2.190E−11 |
| J | −2.094E−14 | 6.563E−15 | −5.572E−14 | −1.804E−13 | −3.707E−14 |

| Surface No. | S9 | S10 | S11 | S12 | S13 |
|---|---|---|---|---|---|
| K | 16.691 | 85.470 | 0.198 | −1.134 | −33.050 |
| A | −5.397E−04 | −4.376E−04 | −7.341E−04 | −1.400E−03 | −3.155E−04 |
| B | 3.382E−05 | −1.800E−05 | 3.249E−06 | 2.984E−06 | −8.303E−05 |
| C | −4.984E−07 | −3.249E−06 | −1.648E−05 | −5.628E−06 | −3.425E−05 |
| D | −6.511E−07 | −1.068E−06 | −6.052E−06 | −7.418E−06 | 1.862E−06 |

TABLE 2-continued

| | | | | | |
|---|---|---|---|---|---|
| E | -7.766E-08 | -4.406E-07 | 4.790E-08 | -3.850E-08 | -6.532E-08 |
| F | 1.080E-09 | 1.132E-09 | 1.142E-09 | -3.223E-10 | -2.509E-09 |
| G | 1.170E-09 | 2.708E-10 | 1.417E-10 | 3.002E-11 | -2.136E-10 |
| H | 1.315E-11 | 1.969E-12 | -1.886E-12 | 7.095E-12 | 8.870E-12 |
| J | 4.003E-13 | 2.899E-13 | -6.327E-12 | 1.507E-12 | 5.040E-12 |

Figure 2:
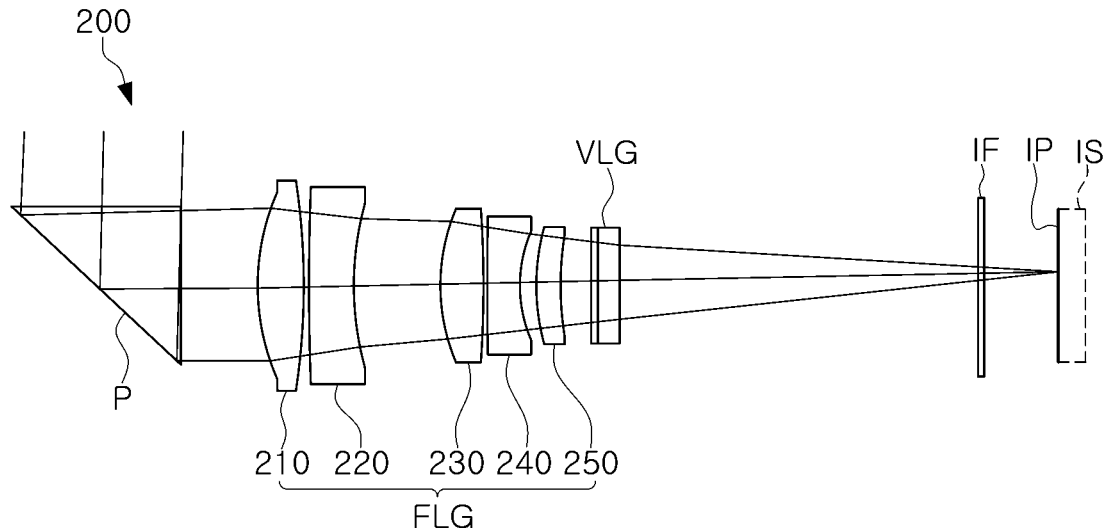
FIG. 2 is a diagram illustrating an optical imaging system according to a second embodiment of the present disclosure.

The optical imaging system according to a second embodiment will be described with reference to FIG. 2.

The optical imaging system 200 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 210, a second lens 220, a third lens 230, a fourth lens 240, and a fifth lens 250 disposed in this order from an object side. The first lens 210 may have positive refractive power, and may have a convex object-side surface and a convex image-side surface. The second lens 220 may have negative refractive power, and may have a convex object-side surface and a concave image-side surface. The third lens 230 may have positive refractive power, and may have a convex object-side surface and a convex image-side surface. The fourth lens 240 may have negative refractive power, and may have a convex object-side surface and a concave image-side surface. The fifth lens 250 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 200 may further include a prism P, an optical path changing element. The prism P may be disposed in front (an object-side surface) of the fixed-focus lens group FLG. The optical imaging system 200 may include an imaging plane IP. In the embodiment, an imaging plane IP may be formed on the surface of the image sensor IS.

The optical imaging system 200 may further include a filter IF. The filter IF may be disposed between the variable-focus lens group VLG and an imaging plane IP.

Tables 3 and 4 list lens characteristics and aspheric coefficients of the optical imaging system according to the present embodiment.

TABLE 3

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 7.024 | 1.800 | 1.534 | 55.7 |
| S5 | | -36.252 | 0.093 | | |
| S6 | Second lens | 78.042 | 1.321 | 1.641 | 23.9 |
| S7 | | 7.485 | 3.100 | | |
| S8 | Third lens | 8.174 | 1.444 | 1.679 | 19.2 |
| S9 | | -176.021 | 0.150 | | |
| S10 | Fourth lens | 198.601 | 1.147 | 1.641 | 23.9 |
| S11 | | 5.800 | 0.542 | | |
| S12 | Fifth lens | 10.699 | 0.850 | 1.546 | 56.1 |
| S13 | | 11.79 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 13.000 | | |
| S18 | Filter | Infinity | 0.110 | 1.519 | 64.2 |
| S19 | | Infinity | 1.871 | | |
| S20 | Imaging Plane | Infinity | 0.010 | | |

TABLE 4

| Surface No. | S4 | S5 | S6 | S7 | S8 |
|---|---|---|---|---|---|
| K | -0.654 | 2.572 | 90.706 | 0.192 | 0.386 |
| A | 5.618E-05 | 1.218E-04 | -2.183E-04 | -4.996E-04 | -3.988E-04 |
| B | -6.490E-07 | -2.003E-06 | 9.145E-06 | 3.270E-06 | 9.964E-06 |
| C | -1.598E-07 | -1.273E-07 | 1.529E-08 | -2.379E-07 | -4.761E-07 |
| D | -1.212E-08 | -1.108E-08 | -4.737E-10 | 7.178E-09 | -3.445E-08 |
| E | -7.430E-10 | -9.606E-10 | -5.749E-11 | -3.368E-10 | 4.072E-10 |
| F | -3.901E-11 | -7.530E-11 | 6.704E-12 | -7.911E-11 | 2.752E-10 |
| G | -2.159E-12 | -4.780E-12 | 4.548E-13 | -8.113E-12 | 4.943E-11 |
| H | -1.515E-13 | -2.172E-13 | -1.042E-13 | -4.239E-13 | 4.257E-12 |
| J | -1.439E-14 | -4.574E-17 | -2.943E-14 | 4.755E-14 | 4.579E-14 |

| Surface No. | S9 | S10 | S11 | S12 | S13 |
|---|---|---|---|---|---|
| K | -99.000 | 62.043 | 0.420 | -3.023 | -18.374 |
| A | -5.282E-04 | -3.962E-04 | -6.449E-04 | -1.440E-03 | -1.316E-04 |

TABLE 4-continued

| B | 2.777E−05 | 6.270E−06 | 2.908E−05 | 4.291E−05 | 1.588E−05 |
|---|---|---|---|---|---|
| C | 7.932E−07 | 1.244E−06 | −3.161E−07 | 6.029E−06 | −4.855E−06 |
| D | 8.182E−08 | −4.363E−08 | −1.895E−07 | −1.175E−07 | −2.465E−07 |
| E | 1.393E−09 | −6.455E−09 | −2.716E−08 | −7.397E−08 | −6.164E−08 |
| F | −3.457E−10 | −2.660E−10 | 4.735E−09 | −1.297E−08 | −3.493E−09 |
| G | −5.080E−11 | −1.042E−12 | 3.816E−11 | −3.068E−10 | −7.360E−11 |
| H | −1.237E−12 | −5.706E−12 | −3.876E−12 | −2.790E−11 | −9.215E−12 |
| J | 5.204E−13 | −3.000E−13 | −2.071E−12 | −1.692E−12 | −2.659E−12 |

Figure 3:
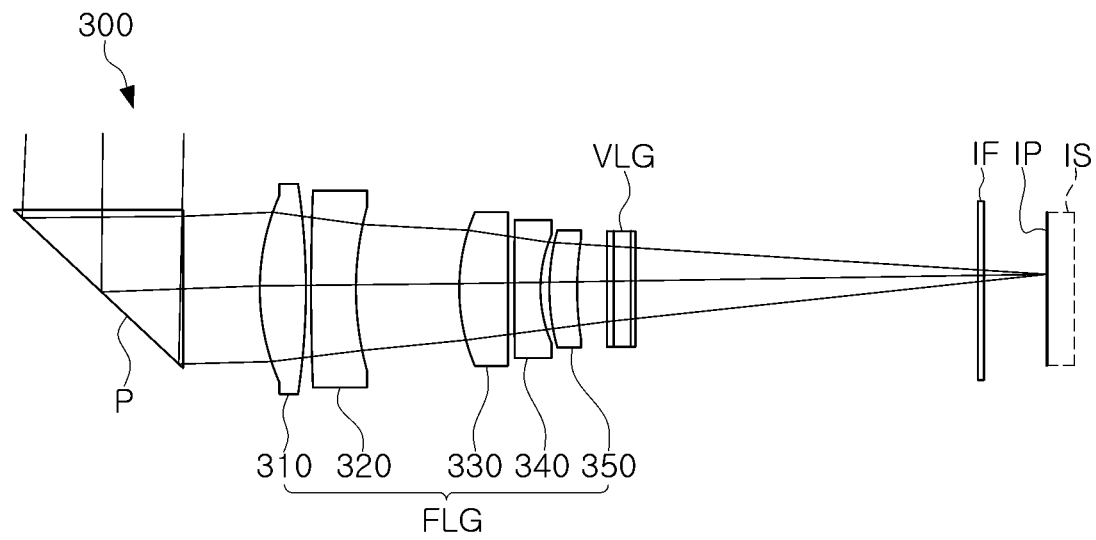
FIG. 3 is a diagram illustrating an optical imaging system according to a third embodiment of the present disclosure.

The optical imaging system according to a third embodiment will be described with reference to FIG. 3.

The optical imaging system 300 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 310, a second lens 320, a third lens 330, a fourth lens 340, and a fifth lens 350 disposed in this order from an object side. The first lens 310 may have positive refractive power, and may have a convex object-side surface and a convex image-side surface. The second lens 320 may have negative refractive power, and may have a convex object-side surface and a concave image-side surface. The third lens 330 may have positive refractive power, and may have a convex object-side surface and a convex image-side surface. The fourth lens 340 may have negative refractive power, and may have a convex object-side surface and a concave image-side surface. The fifth lens 350 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 300 may further include a prism P, an optical path changing element. The prism P may be disposed in front (an object side) of the fixed-focus lens group FLG. The optical imaging system 300 may include an imaging plane IP. In the embodiment, an imaging plane IP may be formed on the surface of the image sensor IS.

The optical imaging system 300 may further include a filter IF. The filter IF may be disposed between the variable-focus lens group VLG and an imaging plane IP.

Tables 5 and 6 list lens characteristics and aspheric coefficients of the optical imaging system according to the present embodiment.

TABLE 5

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 7.024 | 1.800 | 1.534 | 55.7 |
| S5 | | −36.252 | 0.093 | | |
| S6 | Second lens | 78.042 | 1.321 | 1.641 | 23.9 |
| S7 | | 7.485 | 3.100 | | |
| S8 | Third lens | 8.174 | 1.444 | 1.679 | 19.2 |
| S9 | | −176.021 | 0.150 | | |
| S10 | Fourth lens | 198.601 | 1.147 | 1.641 | 23.9 |
| S11 | | 5.800 | 0.542 | | |
| S12 | Fifth lens | 10.699 | 0.850 | 1.546 | 56.1 |
| S13 | | 11.79 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 12.000 | | |
| S18 | Filter | Infinity | 0.110 | 1.519 | 64.2 |
| S19 | | Infinity | 2.392 | | |
| S20 | Imaging Plane | Infinity | 0.006 | | |

TABLE 6

| Surface No. | S4 | S5 | S6 | S7 | S8 |
|---|---|---|---|---|---|
| K | −0.667 | 3.084 | 90.306 | 0.184 | 0.371 |
| A | 5.168E−05 | 1.207E−04 | −2.178E−04 | −5.038E−04 | −4.013E−04 |
| B | −1.203E−06 | −2.075E−06 | 9.001E−06 | 3.852E−06 | 8.385E−06 |
| C | −1.832E−07 | −1.482E−07 | 1.995E−08 | −1.718E−07 | −6.936E−07 |
| D | −1.274E−08 | −1.314E−08 | 8.293E−10 | 1.416E−08 | −6.334E−08 |
| E | −7.570E−10 | −1.100E−09 | 8.754E−11 | 3.791E−10 | −3.137E−09 |
| F | −3.930E−11 | −8.239E−11 | 1.933E−11 | −1.452E−11 | −1.075E−10 |
| G | −2.274E−12 | −4.921E−12 | 1.489E−12 | −4.043E−12 | 2.253E−11 |
| H | −1.748E−13 | −1.995E−13 | −2.954E−14 | −3.453E−13 | 3.998E−12 |
| J | −1.740E−14 | 3.721E−15 | −2.411E−14 | 1.425E−14 | 3.282E−13 |

| Surface No. | S9 | S10 | S11 | S12 | S13 |
|---|---|---|---|---|---|
| K | −89.279 | −10.626 | 0.420 | −3.010 | −17.399 |
| A | −5.185E−04 | −4.004E−04 | −6.397E−04 | −1.433E−03 | −1.029E−04 |

TABLE 6-continued

| B | 2.950E−05 | 4.944E−06 | 2.586E−05 | 4.781E−05 | 8.414E−06 |
|---|---|---|---|---|---|
| C | 9.511E−07 | 1.060E−06 | −1.760E−06 | 7.086E−06 | −7.671E−06 |
| D | 1.000E−07 | −8.607E−08 | −4.350E−07 | −9.681E−08 | −6.879E−07 |
| E | 3.021E−09 | −1.504E−08 | −6.194E−08 | −1.047E−07 | −6.957E−08 |
| F | −4.869E−10 | −1.410E−09 | −2.788E−09 | −2.340E−08 | 2.174E−08 |
| G | −1.863E−10 | −1.467E−10 | 3.816E−11 | −3.068E−10 | −7.360E−11 |
| H | −4.119E−11 | 1.713E−12 | −3.876E−12 | −2.790E−11 | −9.215E−12 |
| J | −7.559E−12 | −3.000E−13 | −2.071E−12 | −1.692E−12 | −2.659E−12 |

Figure 4:
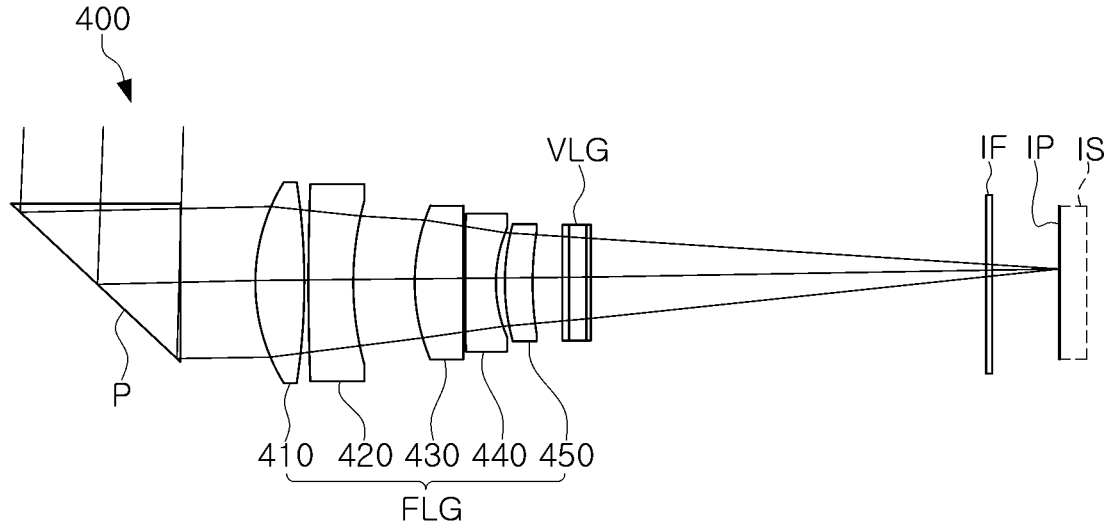
FIG. 4 is a diagram illustrating an optical imaging system according to a fourth embodiment of the present disclosure.

The optical imaging system according to a fourth embodiment will be described with reference to FIG. 4.

The optical imaging system 400 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 410, a second lens 420, a third lens 430, a fourth lens 440, and a fifth lens 450 disposed in this order from an object side. The first lens 410 may have positive refractive power, and may have a convex object-side surface and a convex image-side surface. The second lens 420 may have negative refractive power, and may have a concave object-side surface and a concave image-side surface. The third lens 430 may have positive refractive power, and may have a convex object-side surface and a concave image-side surface. The fourth lens 440 may have negative refractive power, and may have a convex object-side surface and a concave image-side surface. The fifth lens 450 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 400 may further include a prism P, an optical path changing element. The prism P may be disposed in front (an object side) of the fixed-focus lens group FLG. The optical imaging system 400 may include an imaging plane IP. In the embodiment, an imaging plane IP may be formed on the surface of the image sensor IS.

The optical imaging system 400 may further include a filter IF. The filter IF may be disposed between the variable-focus lens group VLG and an imaging plane IP.

Tables 7 and 8 list lens characteristics and aspheric coefficients of the optical imaging system according to the present embodiment.

TABLE 7

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 7.092 | 1.700 | 1.534 | 55.7 |
| S5 | | −26.401 | 0.030 | | |
| S6 | Second lens | −345.378 | 1.468 | 1.641 | 23.9 |
| S7 | | 7.901 | 2.184 | | |
| S8 | Third lens | 7.753 | 1.600 | 1.689 | 18.1 |
| S9 | | 42.240 | 0.052 | | |
| S10 | Fourth lens | 24.359 | 1.166 | 1.641 | 23.9 |
| S11 | | 5.296 | 0.399 | | |
| S12 | Fifth lens | 9.984 | 0.800 | 1.546 | 56.1 |
| S13 | | 11.28 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 14.000 | | |
| S18 | Filter | Infinity | 0.110 | 1.519 | 64.2 |
| S19 | | Infinity | 1.766 | | |
| S20 | Imaging Plane | Infinity | 0.004 | | |

TABLE 8

| Surface No. | S4 | S5 | S6 | S7 | S8 |
|---|---|---|---|---|---|
| K | −0.645 | 4.941 | 92.651 | 0.167 | 0.376 |
| A | 5.993E−05 | 1.135E−04 | −2.189E−04 | −5.095E−04 | −3.996E−04 |
| B | −1.077E−06 | −2.247E−06 | 8.329E−06 | 4.161E−06 | 7.157E−06 |
| C | −1.930E−07 | −1.717E−07 | −3.442E−08 | −2.426E−07 | −7.495E−07 |
| D | −1.437E−08 | −1.564E−08 | −2.073E−09 | −6.145E−09 | −4.389E−08 |
| E | −9.580E−10 | −1.282E−09 | −9.697E−11 | −2.446E−09 | 1.419E−09 |
| F | −6.108E−11 | −9.114E−11 | 5.115E−12 | −2.813E−10 | 4.603E−10 |
| G | −4.085E−12 | −6.266E−12 | 3.517E−13 | −1.490E−11 | 1.028E−10 |
| H | −3.089E−13 | −3.233E−13 | −1.070E−13 | 1.057E−12 | 5.876E−12 |
| J | −2.663E−14 | −8.670E−15 | −2.430E−14 | 4.254E−13 | −8.612E−13 |

TABLE 8-continued

| Surface No. | S9 | S10 | S11 | S12 | S13 |
|---|---|---|---|---|---|
| K | −87.877 | −9.215 | 0.416 | −3.037 | −16.151 |
| A | −5.170E−04 | −3.939E−04 | −6.410E−04 | −1.432E−03 | −5.634E−05 |
| B | 3.036E−05 | 5.997E−06 | 2.137E−05 | 5.725E−05 | 1.078E−06 |
| C | 9.726E−07 | 1.291E−06 | −2.338E−06 | 7.718E−06 | −7.563E−06 |
| D | 9.101E−08 | −5.551E−08 | −4.043E−07 | −5.957E−07 | 2.359E−07 |
| E | 2.723E−09 | −1.486E−08 | −6.965E−08 | −3.052E−07 | 6.763E−08 |
| F | −1.471E−09 | −2.944E−09 | −2.444E−08 | −5.058E−08 | −6.071E−08 |
| G | −2.866E−10 | −1.359E−10 | 3.816E−11 | −3.068E−10 | −7.360E−11 |
| H | −2.929E−11 | −2.144E−11 | −3.876E−12 | −2.790E−11 | −9.215E−12 |
| J | −1.969E−12 | −3.000E−13 | −2.071E−12 | −1.692E−12 | −2.659E−12 |

Figure 5:
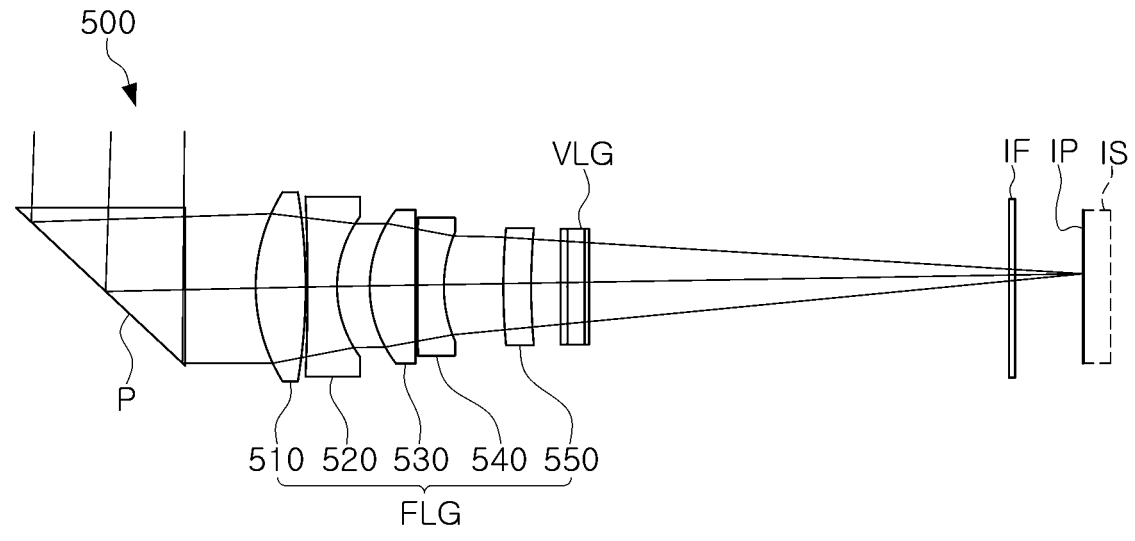
FIG. 5 is a diagram illustrating an optical imaging system according to a fifth embodiment of the present disclosure.

The optical imaging system according to a fifth embodiment will be described with reference to FIG. 5.

The optical imaging system 500 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 510, a second lens 520, a third lens 530, a fourth lens 540, and a fifth lens 550 disposed in this order from an object side. The first lens 510 may have positive refractive power, and may have a convex object-side surface and a convex image-side surface. The second lens 520 may have negative refractive power, and may have a concave object-side surface and a concave image-side surface. The third lens 530 may have positive refractive power, and may have a convex object-side surface and a convex image-side surface. The fourth lens 540 may have negative refractive power, and may have a convex object-side surface and a concave image-side surface. The fifth lens 550 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 500 may further include a prism P, an optical path changing element. The prism P may be disposed in front (an object side) of the fixed-focus lens group FLG. The optical imaging system 500 may include an imaging plane IP. In the embodiment, an imaging plane IP may be formed on the surface of the image sensor IS.

The optical imaging system 500 may further include a filter IF. The filter IF may be disposed between the variable-focus lens group VLG and an imaging plane IP.

Tables 9 and 10 list lens characteristics and aspheric coefficients of the optical imaging system according to the present embodiment.

TABLE 9

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 6.962 | 1.723 | 1.534 | 55.7 |
| S5 | | −24.793 | 0.030 | | |
| S6 | Second lens | −88.029 | 1.211 | 1.646 | 23.5 |
| S7 | | 6.190 | 0.961 | | |
| S8 | Third lens | 5.733 | 1.600 | 1.668 | 20.4 |
| S9 | | −83.620 | 0.061 | | |
| S10 | Fourth lens | 343.531 | 0.887 | 1.641 | 23.9 |
| S11 | | 5.675 | 2.062 | | |
| S12 | Fifth lens | 11.553 | 0.866 | 1.546 | 56.1 |
| S13 | | 11.56 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 15.000 | | |
| S18 | Filter | Infinity | 0.110 | 1.519 | 64.2 |
| S19 | | Infinity | 1.261 | | |
| S20 | Imaging Plane | Infinity | 0.007 | | |

TABLE 10

| Surface No. | S4 | S5 | S6 | S7 | S8 |
|---|---|---|---|---|---|
| K | −0.586 | 8.716 | 91.941 | 0.236 | 0.294 |
| A | 8.120E−05 | 9.274E−05 | −2.352E−04 | −4.809E−04 | −4.602E−04 |
| B | −1.925E−07 | −3.552E−06 | 8.445E−06 | 3.982E−06 | 5.495E−06 |
| C | −2.230E−07 | −1.992E−07 | 2.557E−08 | −2.623E−07 | −9.308E−07 |
| D | −2.090E−08 | −1.557E−08 | 6.892E−09 | −9.109E−09 | −7.961E−08 |
| E | −1.549E−09 | −1.375E−09 | 1.125E−09 | −3.066E−09 | −2.961E−09 |
| F | −1.083E−10 | −7.601E−11 | 1.481E−10 | −4.353E−10 | 3.281E−11 |

TABLE 10-continued

| G | −8.189E−12 | −3.429E−12 | 1.295E−11 | −3.391E−11 | 6.200E−11 |
|---|---|---|---|---|---|
| H | −6.745E−13 | 1.029E−14 | 9.269E−13 | −2.059E−14 | 4.403E−12 |
| J | −5.277E−14 | 4.723E−14 | 7.004E−14 | 6.999E−13 | −6.276E−13 |

| Surface No. | S9 | S10 | S11 | S12 | S13 |
|---|---|---|---|---|---|
| K | 98.796 | −0.886 | 0.446 | −2.124 | −14.399 |
| A | −4.721E−04 | −4.377E−04 | −5.800E−04 | −1.373E−03 | 6.407E−05 |
| B | 2.945E−05 | 5.995E−06 | 1.525E−05 | 5.978E−05 | 4.586E−05 |
| C | 8.776E−07 | 1.070E−06 | −3.815E−06 | 4.716E−06 | 8.018E−07 |
| D | 1.013E−07 | −1.357E−07 | −9.274E−07 | −1.671E−06 | −1.343E−07 |
| E | 2.086E−11 | −2.216E−08 | −2.165E−07 | −4.735E−07 | −7.476E−07 |
| F | −8.790E−10 | −3.006E−09 | −4.623E−08 | −5.320E−08 | −8.305E−09 |
| G | −1.669E−10 | −6.393E−10 | 1.909E−09 | −6.800E−10 | −7.360E−11 |
| H | −4.585E−11 | −1.061E−10 | −3.744E−11 | −2.790E−11 | −9.215E−12 |
| J | −3.109E−12 | 1.215E−12 | −2.071E−12 | −1.692E−12 | −2.659E−12 |

Figure 6:
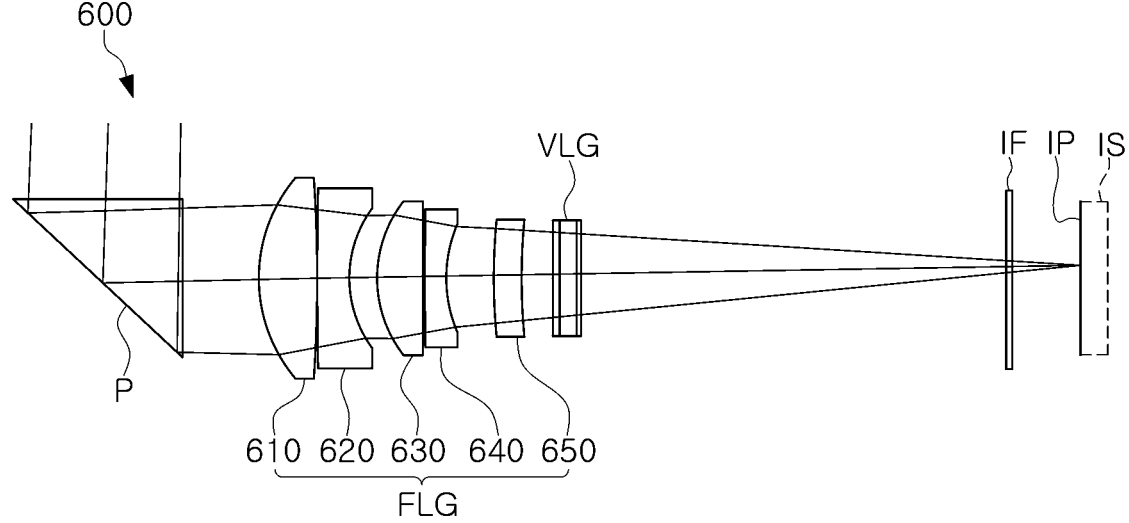
FIG. 6 is a diagram illustrating an optical imaging system according to a sixth embodiment of the present disclosure.

The optical imaging system according to a sixth embodiment will be described with reference to FIG. 6.

The optical imaging system 600 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 610, a second lens 620, a third lens 630, a fourth lens 640, and a fifth lens 650 disposed in this order from an object side. The first lens 610 may have positive refractive power, and may have a convex object-side surface and a convex image-side surface. The second lens 620 may have negative refractive power, and may have a convex object-side surface and a concave image-side surface. The third lens 630 may have positive refractive power, and may have a convex object-side surface and a convex image-side surface. The fourth lens 640 may have negative refractive power, and may have a concave object-side surface and a concave image-side surface. The fifth lens 650 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 600 may further include a prism P, an optical path changing element. The prism P may be disposed in front (an object side) of the fixed-focus lens group FLG. The optical imaging system 600 may include an imaging plane IP. In the embodiment, an imaging plane IP may be formed on the surface of the image sensor IS.

The optical imaging system 600 may further include a filter IF. The filter IF may be disposed between the variable-focus lens group VLG and an imaging plane IP.

Tables 11 and 12 list lens characteristics and aspheric coefficients of the optical imaging system according to the present embodiment.

TABLE 11

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 5.825 | 1.993 | 1.534 | 55.7 |
| S5 | | −70.761 | 0.035 | | |
| S6 | Second lens | 249.315 | 1.106 | 1.646 | 23.5 |
| S7 | | 4.973 | 0.948 | | |
| S8 | Third lens | 5.362 | 1.599 | 1.668 | 20.4 |
| S9 | | −39.088 | 0.074 | | |
| S10 | Fourth lens | −100.722 | 0.682 | 1.641 | 23.9 |
| S11 | | 5.744 | 1.561 | | |
| S12 | Fifth lens | 15.815 | 1.000 | 1.546 | 56.1 |
| S13 | | 16.96 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 15.000 | | |
| S18 | Filter | Infinity | 0.110 | 1.519 | 64.2 |
| S19 | | Infinity | 1.172 | | |
| S20 | Imaging Plane | Infinity | 0.001 | | |

TABLE 12

| Surface No. | S4 | S5 | S6 | S7 | S8 |
|---|---|---|---|---|---|
| K | −0.447 | −7.839 | 99.000 | 0.151 | 0.372 |
| A | 1.540E−04 | 1.080E−04 | −1.930E−04 | −5.402E−04 | −4.018E−04 |
| B | 5.381E−06 | 1.502E−07 | 1.176E−05 | −2.974E−06 | 1.363E−05 |
| C | 1.314E−07 | 2.828E−07 | 1.851E−07 | −5.751E−07 | −3.359E−07 |
| D | 9.456E−10 | 2.743E−08 | 1.110E−08 | 3.431E−08 | −9.068E−08 |

TABLE 12-continued

| | | | | | |
|---|---|---|---|---|---|
| E | 8.313E–11 | 1.468E–09 | 1.258E–09 | 5.219E–09 | –7.564E–09 |
| F | 2.150E–11 | 5.305E–11 | 1.396E–10 | 4.652E–10 | –6.016E–10 |
| G | 2.213E–12 | –6.215E–12 | 1.528E–11 | 4.253E–12 | 2.229E–11 |
| H | –7.043E–14 | –1.192E–12 | 9.772E–13 | –4.517E–12 | 5.854E–12 |
| J | –8.022E–14 | 1.012E–13 | 1.070E–14 | –3.805E–13 | –1.348E–13 |

| Surface No. | S9 | S10 | S11 | S12 | S13 |
|---|---|---|---|---|---|
| K | –62.207 | 0.000 | 0.430 | –7.397 | –24.785 |
| A | 8.755E–06 | 0.000E+00 | –5.991E–04 | –1.574E–03 | –4.469E–04 |
| B | 6.813E–05 | 0.000E+00 | 1.516E–05 | –2.475E–05 | –6.696E–05 |
| C | –1.728E–06 | 0.000E+00 | –3.529E–06 | –9.731E–06 | –2.147E–05 |
| D | –4.689E–07 | 0.000E+00 | –7.256E–07 | –3.299E–06 | 3.356E–06 |
| E | 1.544E–08 | 0.000E+00 | –2.023E–07 | –3.974E–07 | –7.099E–07 |
| F | 1.214E–08 | 0.000E+00 | –4.767E–08 | 3.923E–08 | 6.040E–08 |
| G | –1.505E–09 | 0.000E+00 | 6.178E–10 | –6.766E–11 | –7.360E–11 |
| H | 1.687E–10 | 0.000E+00 | 3.088E–10 | –2.790E–11 | –9.215E–12 |
| J | –5.403E–12 | 0.000E+00 | 1.245E–12 | –1.692E–12 | –2.659E–12 |

Figure 7:
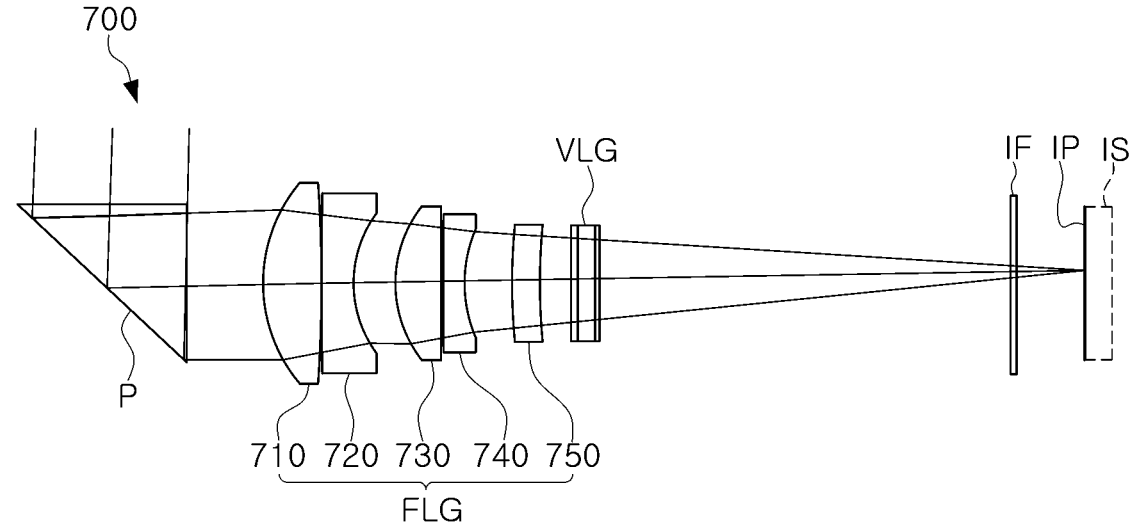
FIG. 7 is a diagram illustrating an optical imaging system according to a seventh embodiment of the present disclosure.

The optical imaging system according to a seventh embodiment will be described with reference to FIG. 7.

The optical imaging system 700 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 710, a second lens 720, a third lens 730, a fourth lens 740, and a fifth lens 750 disposed in this order from an object side. The first lens 710 may have positive refractive power, and may have a convex object-side surface and a convex image-side surface. The second lens 720 may have negative refractive power, and may have a convex object-side surface and a concave image-side surface. The third lens 730 may have positive refractive power, and may have a convex object-side surface and a convex image-side surface. The fourth lens 740 may have negative refractive power, and may have a concave object-side surface and a concave image-side surface. The fifth lens 750 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 700 may further include a prism P, an optical path changing element. The prism P may be disposed in front (an object side) of the fixed-focus lens group FLG. The optical imaging system 700 may include an imaging plane IP. In the embodiment, an imaging plane IP may be formed on the surface of the image sensor IS.

The optical imaging system 700 may further include a filter IF. The filter IF may be disposed between the variable-focus lens group VLG and an imaging plane IP.

Tables 13 and 14 list lens characteristics and aspheric coefficients of the optical imaging system according to the present embodiment.

TABLE 13

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 5.87 | 1.974 | 1.546 | 56.0 |
| S5 | | –66.56 | 0.100 | | |
| S6 | Second lens | 872.52 | 1.112 | 1.646 | 23.5 |
| S7 | | 4.93 | 1.427 | | |
| S8 | Third lens | 5.32 | 1.606 | 1.668 | 20.4 |
| S9 | | –39.07 | 0.100 | | |
| S10 | Fourth lens | –100.24 | 0.572 | 1.641 | 23.9 |
| S11 | | 5.74 | 1.560 | | |
| S12 | Fifth lens | 15.92 | 1.016 | 1.546 | 56.1 |
| S13 | | 17.42 | 1.000 | | |
| S14 | Liquid lens | Infinity | 0.200 | 1.550 | 30.0 |
| S15 | | Infinity | 0.700 | 1.333 | 90.0 |
| S16 | | Infinity | 0.100 | 1.550 | 30.0 |
| S17 | | Infinity | 14.000 | | |
| S18 | Filter | Infinity | 0.110 | 1.519 | 64.2 |
| S19 | | Infinity | 1.962 | | |
| S20 | Imaging Plane | Infinity | –0.002 | | |

TABLE 14

| Surface No. | S4 | S5 | S6 | S7 | S8 |
|---|---|---|---|---|---|
| K | –0.444 | –7.839 | 99.000 | 0.151 | 0.372 |
| A | 1.782E–04 | 1.080E–04 | –1.930E–04 | –5.402E–04 | –4.018E–04 |
| B | –1.456E–05 | 1.502E–07 | 1.176E–05 | –2.974E–06 | 1.363E–05 |

TABLE 14-continued

| | | | | | |
|---|---|---|---|---|---|
| C | 9.381E-06 | 2.828E-07 | 1.851E-07 | -5.751E-07 | -3.359E-07 |
| D | -2.567E-06 | 2.743E-08 | 1.110E-08 | 3.431E-08 | -9.068E-08 |
| E | 4.470E-07 | 1.468E-09 | 1.258E-09 | 5.219E-09 | -7.564E-09 |
| F | -4.891E-08 | 5.305E-11 | 1.396E-10 | 4.652E-10 | -6.016E-10 |
| G | 3.276E-09 | -6.215E-12 | 1.528E-11 | 4.253E-12 | 2.229E-11 |
| H | -1.224E-10 | -1.192E-12 | 9.772E-13 | -4.517E-12 | 5.854E-12 |
| J | 1.890E-12 | 1.012E-13 | 1.070E-14 | -3.805E-13 | -1.348E-13 |

| Surface No. | S9 | S10 | S11 | S12 | S13 |
|---|---|---|---|---|---|
| K | -62.207 | 0.000 | 0.430 | -7.397 | -24.785 |
| A | 8.755E-06 | 0.000E+00 | -5.991E-04 | -1.574E-03 | -4.469E-04 |
| B | 6.813E-05 | 0.000E+00 | 1.516E-05 | -2.475E-05 | -6.696E-05 |
| C | -1.728E-06 | 0.000E+00 | -3.529E-06 | -9.731E-06 | -2.147E-05 |
| D | -4.689E-07 | 0.000E+00 | -7.256E-07 | -3.299E-06 | 3.356E-06 |
| E | 1.544E-08 | 0.000E+00 | -2.023E-07 | -3.974E-07 | -7.099E-07 |
| F | 1.214E-08 | 0.000E+00 | -4.767E-08 | 3.923E-08 | 6.040E-08 |
| G | -1.505E-09 | 0.000E+00 | 6.178E-10 | -6.766E-11 | -7.360E-11 |
| H | 1.687E-10 | 0.000E+00 | 3.088E-10 | -2.790E-11 | -9.215E-12 |
| J | -5.403E-12 | 0.000E+00 | 1.245E-12 | -1.692E-12 | -2.659E-12 |

Figure 8:
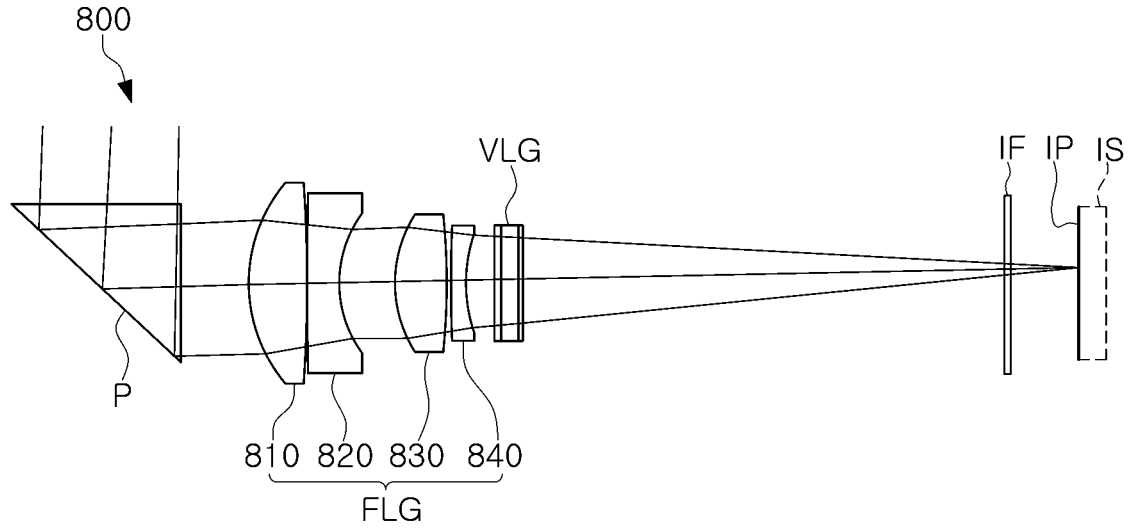
FIG. 8 is a diagram illustrating an optical imaging system according to an eighth embodiment of the present disclosure.

The optical imaging system according to an eighth embodiment will be described with reference to FIG. 8.

The optical imaging system 800 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 810, a second lens 820, a third lens 830, and a fourth lens 840 disposed in this order from an object side. The first lens 810 may have positive refractive power, and may have a convex object-side surface and a convex image-side surface. The second lens 820 may have negative refractive power, and may have a concave object-side surface and a concave image-side surface. The third lens 830 may have positive refractive power, and may have a convex object-side surface and a convex image-side surface. The fourth lens 840 may have negative refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 800 may further include a prism P, an optical path changing element. The prism P may be disposed in front (an object side) of the fixed-focus lens group FLG. The optical imaging system 800 may include an imaging plane IP. In the embodiment, an imaging plane IP may be formed on the surface of the image sensor IS.

The optical imaging system 800 may further include a filter IF. The filter IF may be disposed between the variable-focus lens group VLG and an imaging plane IP.

Tables 15 and 16 list lens characteristics and aspheric coefficients of the optical imaging system according to the present embodiment.

TABLE 15

| Surface No. | Elements | Radius of curvature | Thickness/ Distance | Refractive Index | Abbe Number |
|---|---|---|---|---|---|
| S1 | Prism | Infinity | 2.841 | 1.723 | 29.5 |
| S2 | | Infinity | 2.841 | 1.723 | 29.5 |
| S3 | | Infinity | 2.500 | | |
| S4 | First lens | 5.99 | 2.018 | 1.546 | 56.0 |
| S5 | | 35.82 | 0.100 | | |
| S6 | Second lens | -73.80 | 1.205 | 1.646 | 23.5 |
| S7 | | 4.92 | 1.725 | | |
| S8 | Third lens | 5.44 | 1.797 | 1.668 | 20.4 |
| S9 | | -24.16 | 0.120 | | |
| S10 | Fourth lens | 86.70 | 0.509 | 1.641 | 23.9 |
| S11 | | 5.10 | 1.000 | | |
| S12 | Liquid lens | Infinity | 0.200 | 1.550 | 30.0 |
| S13 | | Infinity | 0.700 | 1.333 | 90.0 |
| S14 | | Infinity | 0.100 | 1.550 | 30.0 |
| S15 | | Infinity | 15.000 | | |
| S16 | Filter | Infinity | 0.110 | 1.519 | 64.2 |
| S17 | | Infinity | 3.513 | | |
| S18 | Imaging Plane | Infinity | -0.001 | | |

TABLE 16

| Surface No. | S4 | S5 | S6 | S7 |
|---|---|---|---|---|
| K | -0.45851 | -7.29691 | 95.27525 | 0.15026 |
| A | 1.620E-04 | 1.068E-04 | -1.920E-04 | -5.412E-04 |
| B | -1.330E-05 | 1.718E-08 | 1.189E-05 | -3.370E-06 |

TABLE 16-continued

| C | 9.302E−06 | 2.833E−07 | 1.858E−07 | −5.584E−07 |
|---|---|---|---|---|
| D | −2.576E−06 | 2.725E−08 | 1.157E−08 | 3.773E−08 |
| E | 4.466E−07 | 1.352E−09 | 1.438E−09 | 4.988E−09 |
| F | −4.890E−08 | 3.475E−11 | 1.710E−10 | 2.957E−10 |
| G | 3.278E−09 | −7.261E−12 | 1.861E−11 | −3.664E−11 |
| H | −1.221E−10 | −8.811E−13 | 1.013E−12 | −1.148E−11 |
| J | 1.904E−12 | 2.413E−13 | −8.833E−14 | −1.192E−12 |

| Surface No. | S8 | S9 | S10 | S11 |
|---|---|---|---|---|
| K | 0.37259 | −62.26121 | −0.14428 | 0.42961 |
| A | −4.015E−04 | 8.037E−06 | 3.122E−07 | −5.989E−04 |
| B | 1.391E−05 | 6.787E−05 | 2.720E−07 | 1.425E−05 |
| C | −3.539E−07 | −1.680E−06 | −1.250E−07 | −3.139E−06 |
| D | −9.318E−08 | −4.598E−07 | −3.366E−08 | −5.645E−07 |
| E | −7.130E−09 | 1.579E−08 | −6.192E−09 | −1.566E−07 |
| F | −3.724E−10 | 1.192E−08 | −1.130E−09 | −3.620E−08 |
| G | 8.472E−11 | −1.597E−09 | −1.676E−10 | 3.995E−09 |
| H | 2.013E−11 | 1.362E−10 | −3.759E−11 | 1.353E−09 |
| J | 2.932E−12 | −1.409E−11 | −9.130E−12 | 3.312E−10 |

Figure 9:
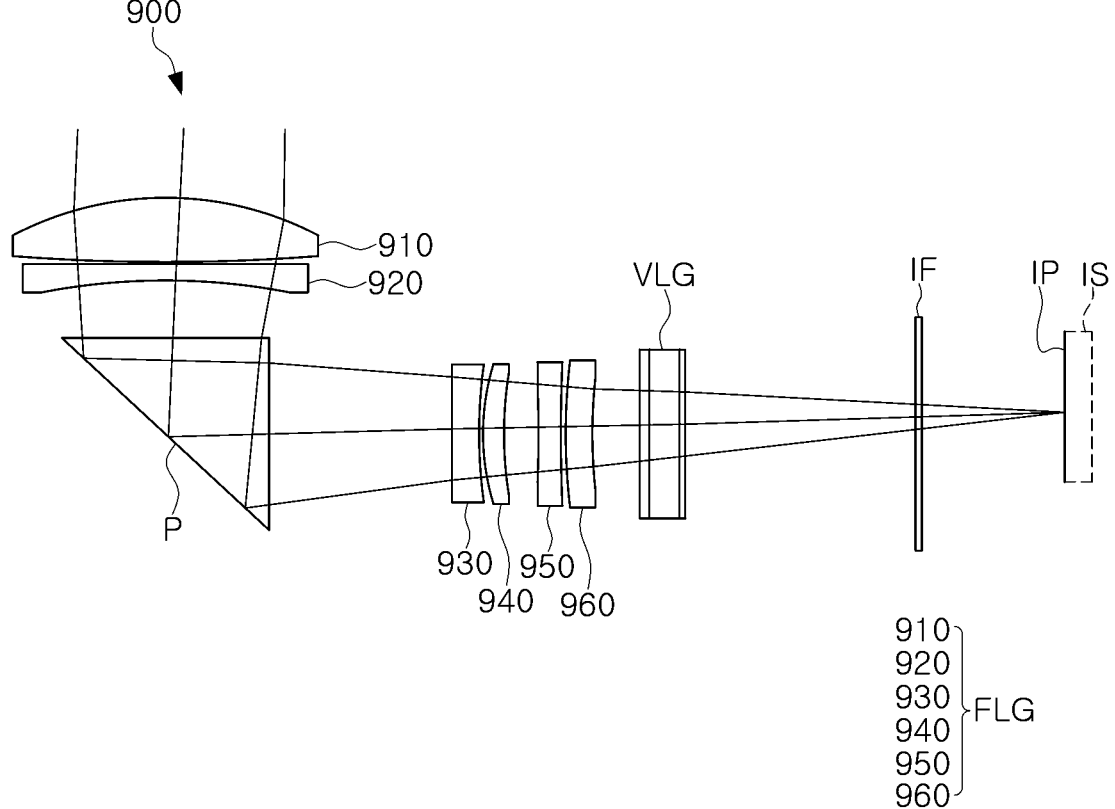
FIG. 9 is a diagram illustrating an optical imaging system according to a ninth embodiment of the present disclosure.

The optical imaging system according to a ninth embodiment will be described with reference to FIG. 9.

The optical imaging system 900 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 910, a second lens 920, a third lens 930, a fourth lens 940, a fifth lens 950, and a sixth lens 960 disposed in this order from an object side. The first lens 910 may have positive refractive power, and may have a convex object-side surface and a convex image-side surface. The second lens 920 may have negative refractive power, and may have a concave object-side surface and a concave image-side surface. The third lens 930 may have negative refractive power, and may have a convex object-side surface and a concave image-side surface. The fourth lens 940 may have positive refractive power, and may have a convex object-side surface and a concave image-side surface. The fifth lens 950 may have negative refractive power, and may have a concave object-side surface and a concave image-side surface. The sixth lens 960 may have positive refractive power, and may have a convex object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 900 may further include a prism P, an optical path changing element. The prism P may be disposed on an object side of the lens having a smallest side among the lenses included in the fixed-focus lens group FLG. For example, the prism P may be disposed between an image side of the second lens 920 and an object side of the third lens 930 (between the second lens 920 and the third lens 930). The optical imaging system 900 may include an imaging plane IP. In the embodiment, an imaging plane IP may be formed on the surface of the image sensor IS.

The optical imaging system 900 may further include a filter IF. The filter IF may be disposed between the variable-focus lens group VLG and an imaging plane IP.

Tables 17 and 18 list lens characteristics and aspheric coefficients of the optical imaging system according to the present embodiment.

TABLE 17

| Surface No. | Elements | Radius of curvature | Thickness/ Distance | Refractive Index | Abbe Number |
|---|---|---|---|---|---|
| S1 | First lens | 6.38 | 1.500 | 1.535 | 55.7 |
| S2 | | −43.55 | 0.050 | | |
| S3 | Second lens | −212.88 | 0.400 | 1.614 | 25.9 |
| S4 | | 13.37 | 0.700 | | |
| S5 | | Infinity | 0.600 | | |
| S6 | | Infinity | 0.000 | | |
| S7 | Prism | Infinity | 2.250 | 1.834 | 37.3 |
| S8 | | Infinity | 2.250 | 1.834 | 37.3 |
| S9 | | Infinity | 4.000 | | |
| S10 | | Infinity | 0.000 | | |
| S11 | Third lens | 321.73 | 0.600 | 1.544 | 56.1 |
| S12 | | 13.06485381 | 0.050 | | |
| S13 | Fourth lens | 6.494202133 | 0.500 | 1.661 | 20.4 |
| S14 | | 13.42373879 | 0.721 | | |
| S15 | Fifth lens | −25.9448854 | 0.500 | 1.639 | 23.5 |
| S16 | | 16.7474665 | 0.095 | | |
| S17 | Sixth lens | 22.33091408 | 0.600 | 1.535 | 55.7 |
| S18 | | 32.37073878 | 1.000 | | |
| S19 | Liquid lens | Infinity | 0.200 | 1.550 | 30.0 |
| S20 | | Infinity | 0.700 | 1.333 | 90.0 |
| S21 | | Infinity | 0.100 | 1.550 | 30.0 |
| S22 | | Infinity | 5.000 | | |
| S23 | Filter | Infinity | 0.210 | 1.517 | 64.2 |
| S24 | | Infinity | 3.058 | | |
| S25 | Imaging Plane | Infinity | −0.004 | | |

TABLE 18

| Surface No. | S1 | S2 | S3 | S4 | S11 | S12 |
|---|---|---|---|---|---|---|
| K | −0.646 | 76.333 | 99.000 | 0.13585 | 2.90519 | −81.426 |
| A | 7.467E−05 | 1.142E−04 | −2.361E−04 | −4.442E−04 | −2.891E−03 | 2.157E−03 |
| B | −4.064E−07 | 4.014E−07 | 7.559E−06 | 7.244E−06 | −2.262E−04 | −4.965E−04 |
| C | −3.134E−07 | 1.531E−07 | 9.478E−08 | −2.875E−07 | −1.811E−05 | −6.525E−05 |
| D | −3.076E−08 | 4.767E−09 | 4.707E−08 | −8.388E−08 | −4.848E−07 | −4.678E−06 |
| E | −2.265E−09 | −2.208E−10 | 3.418E−09 | 3.532E−09 | 5.175E−06 | 1.919E−07 |
| F | −1.840E−10 | −1.279E−10 | 2.065E−10 | −3.924E−11 | −8.747E−09 | −5.160E−10 |
| G | −4.128E−12 | −1.884E−11 | 1.554E−11 | 5.549E−11 | 3.109E−09 | −4.972E−09 |
| H | 3.245E−13 | −5.450E−13 | −3.407E−13 | 3.110E−11 | 3.508E−10 | −5.396E−10 |
| J | −8.731E−14 | 7.671E−14 | −1.886E−13 | −3.090E−12 | −8.927E−11 | 1.145E−10 |

| Surface No. | S13 | S14 | S15 | S16 | S17 | S18 |
|---|---|---|---|---|---|---|
| K | −2.776 | 33.679 | −87.886 | 33.776 | −99.000 | 63.585 |
| A | −1.021E−04 | −1.320E−03 | 8.533E−04 | −3.271E−03 | 7.501E−04 | 2.830E−03 |
| B | 3.540E−04 | −4.690E−04 | 1.123E−04 | −6.534E−05 | 4.769E−04 | 1.286E−04 |
| C | −1.207E−04 | 9.305E−05 | −1.530E−04 | 2.628E−05 | 1.292E−05 | 1.093E−04 |
| D | −3.027E−05 | −2.595E−05 | 5.868E−05 | −1.190E−05 | 2.828E−07 | −1.816E−05 |
| E | −1.532E−07 | 6.136E−08 | −8.380E−07 | 2.461E−06 | 1.559E−06 | 4.196E−06 |
| F | 7.878E−09 | 1.619E−08 | 7.223E−08 | −5.822E−08 | 2.792E−07 | 1.717E−07 |
| G | −7.113E−10 | 4.086E−09 | 4.363E−09 | 4.304E−09 | −1.327E−07 | 3.313E−08 |
| H | 8.260E−10 | 4.053E−10 | 1.431E−09 | 3.357E−09 | 3.314E−10 | −5.703E−08 |
| J | −1.710E−11 | 3.418E−11 | 2.525E−10 | 8.363E−10 | −4.057E−10 | −2.212E−10 |

Figure 10:
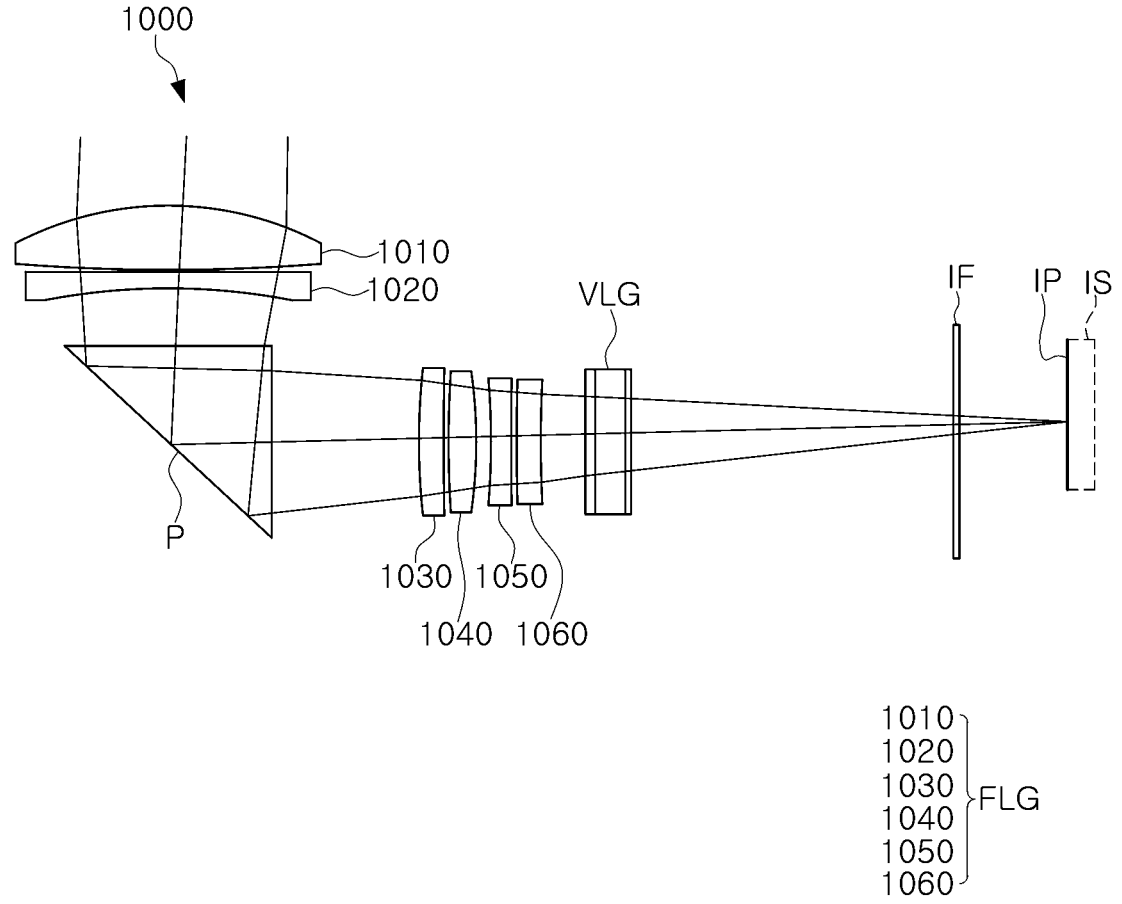
FIG. 10 is a diagram illustrating an optical imaging system according to a tenth embodiment of the present disclosure.

The optical imaging system according to a tenth embodiment will be described with reference to FIG. 10.

The optical imaging system 1000 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 1010, a second lens 1020, a third lens 1030, a fourth lens 1040, a fifth lens 1050, and a sixth lens 1060 disposed in this order from an object side. The first lens 1010 may have positive refractive power, and may have a convex object-side surface and a convex image-side surface. The second lens 1020 may have negative refractive power, and may have a convex object-side surface and a concave image-side surface. The third lens 1030 may have positive refractive power, and may have a convex object-side surface and a concave image-side surface. The fourth lens 1040 may have positive refractive power, and may have a convex object-side surface and a convex image-side surface. The fifth lens 1050 may have negative refractive power, and may have a concave object-side surface and a concave image-side surface. The sixth lens 1060 may have negative refractive power, and may have a concave object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 1000 may further include a prism P, an optical path changing element. The prism P may be disposed between lenses of the fixed-focus lens group FL. For example, the prism P may be disposed between the second lens 1020 and the third lens 1030. The optical imaging system 1000 may include an imaging plane IP. In the embodiment, an imaging plane IP may be formed on the surface of the image sensor IS.

The optical imaging system 1000 may further include a filter IF. The filter IF may be disposed between the variable-focus lens group VLG and an imaging plane IP.

Tables 19 and 20 list lens characteristics and aspheric coefficients of the optical imaging system according to the present embodiment.

TABLE 19

| Surface No. | Elements | Radius of curvature | Thickness/ Distance | Refractive Index | Abbe Number |
|---|---|---|---|---|---|
| S1 | First lens | 6.89 | 1.400 | 1.535 | 55.7 |
| S2 | | −50.04 | 0.050 | | |
| S3 | Second lens | 1000.00 | 0.399 | 1.614 | 25.9 |
| S4 | | 15.09 | 0.700 | | |
| S5 | | Infinity | 0.600 | | |
| S6 | | Infinity | 0.000 | | |
| S7 | Prism | Infinity | 2.250 | 1.834 | 37.3 |
| S8 | | Infinity | 2.250 | 1.834 | 37.3 |
| S9 | | Infinity | 3.263 | | |
| S10 | | Infinity | 0.000 | | |
| S11 | Third lens | 21.09 | 0.569 | 1.544 | 56.1 |
| S12 | | 1000 | 0.059 | | |
| S13 | Fourth lens | 36.013943 | 0.600 | 1.671 | 19.2 |
| S14 | | −18.0196328 | 0.330 | | |
| S15 | Fifth lens | −11.6590582 | 0.450 | 1.639 | 23.5 |
| S16 | | 18.32200203 | 0.121 | | |
| S17 | Sixth lens | −191.362306 | 0.507 | 1.535 | 55.7 |
| S18 | | 15.53092961 | 1.000 | | |

TABLE 19-continued

| Surface No. | Elements | Radius of curvature | Thickness/ Distance | Refractive Index | Abbe Number |
|---|---|---|---|---|---|
| S19 | Liquid lens | Infinity | 0.200 | 1.550 | 30.0 |
| S20 | | Infinity | 0.700 | 1.333 | 90.0 |
| S21 | | Infinity | 0.100 | 1.550 | 30.0 |
| S22 | | Infinity | 7.000 | | |
| S23 | Filter | Infinity | 0.210 | 1.517 | 64.2 |
| S24 | | Infinity | 2.339 | | |
| S25 | Imaging Plane | Infinity | −0.007 | | |

TABLE 20

| Surface No. | S1 | S2 | S3 | S4 | S11 |
|---|---|---|---|---|---|
| K | −0.3006 | 58.1282 | 99.0000 | 5.5599 | 2.905 |
| A | 2.285E−04 | 1.321E−04 | −1.707E−04 | −1.176E−04 | −1.199E−03 |
| B | 2.234E−05 | 1.475E−05 | 1.704E−05 | 4.068E−05 | 1.990E−04 |
| C | 1.606E−06 | 1.673E−06 | 1.437E−06 | 2.097E−06 | 8.101E−05 |
| D | 6.100E−08 | 1.200E−07 | 1.489E−07 | 1.140E−07 | 2.713E−05 |
| E | 2.338E−09 | 8.441E−09 | 1.282E−08 | 1.875E−08 | 2.326E−06 |
| F | 1.999E−10 | 3.365E−10 | 8.617E−10 | 1.028E−09 | −1.799E−06 |
| G | −1.314E−11 | 9.090E−12 | 1.084E−10 | 4.794E−11 | −5.770E−07 |
| H | −3.024E−12 | 3.194E−13 | 2.936E−12 | 6.851E−12 | −5.905E−08 |
| J | −3.458E−13 | −6.280E−13 | −5.998E−13 | −5.683E−14 | 6.714E−08 |

| Surface No. | S12 | S16 | S17 | S18 |
|---|---|---|---|---|
| K | −99.000 | −99.000 | −99.000 | 74.737 |
| A | −7.881E−05 | −4.708E−03 | −9.023E−04 | 4.176E−03 |
| B | 4.347E−05 | −1.938E−04 | −3.162E−04 | −1.410E−03 |
| C | 1.197E−04 | 4.485E−04 | −4.056E−04 | 3.721E−05 |
| D | 9.860E−06 | 3.965E−05 | 3.099E−04 | −1.913E−04 |
| E | −6.123E−08 | −8.711E−06 | −6.051E−06 | 9.305E−05 |
| F | −4.726E−08 | −4.748E−06 | 1.944E−06 | −1.225E−05 |
| G | −1.278E−17 | 3.335E−07 | 5.713E−06 | 4.688E−06 |
| H | −1.015E−18 | 6.079E−07 | 1.999E−06 | −1.590E−06 |
| J | −8.483E−20 | 1.357E−06 | −1.132E−07 | −1.225E−07 |

Figure 11:
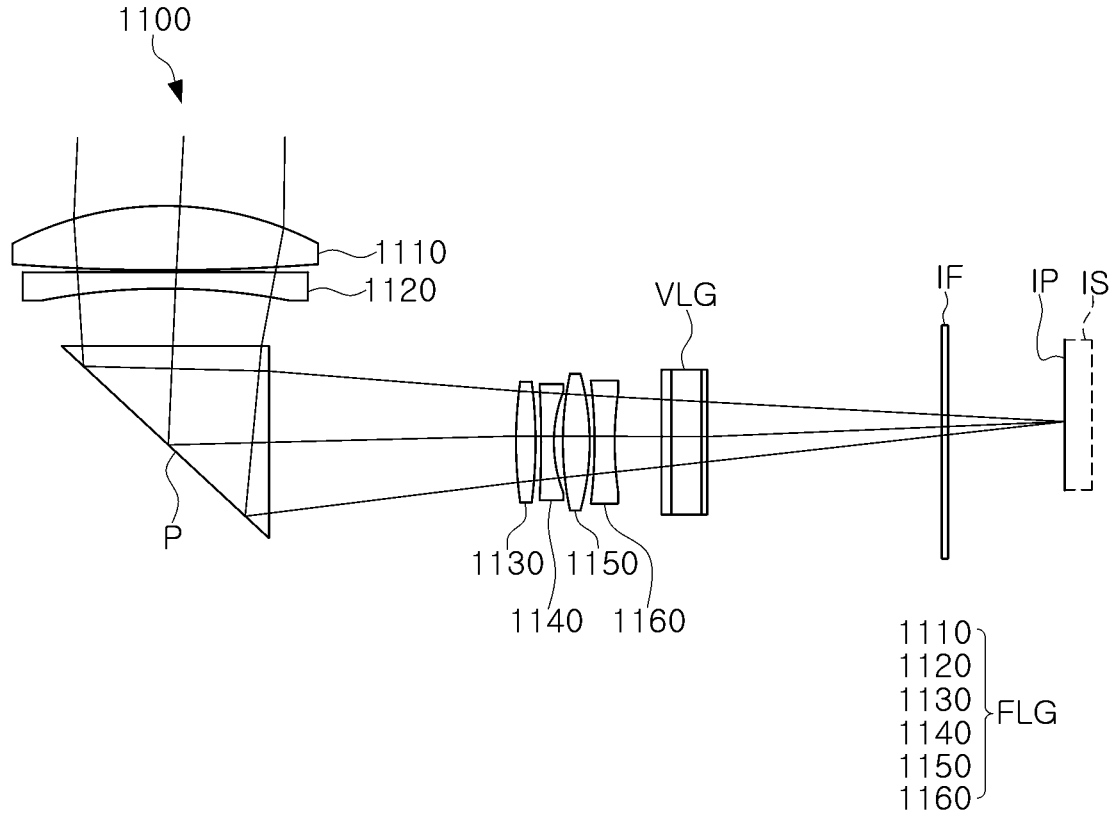
FIG. 11 is a diagram illustrating an optical imaging system according to an eleventh embodiment of the present disclosure.

The optical imaging system according to an eleventh embodiment will be described with reference to FIG. 11.

The optical imaging system 1100 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 1110, a second lens 1120, a third lens 1130, a fourth lens 1140, a fifth lens 1150, and a sixth lens 1160 disposed in this order from an object side. The first lens 1110 may have positive refractive power, and may have a convex object-side surface and a concave image-side surface. The second lens 1120 may have negative refractive power, and may have a convex object-side surface and a concave image-side surface. The third lens 1130 may have positive refractive power, and may have a convex object-side surface and a convex image-side surface. The fourth lens 1140 may have negative refractive power, and may have a concave object-side surface and a concave image-side surface. The fifth lens 1150 may have positive refractive power, and may have a convex object-side surface and a convex image-side surface. The sixth lens 1160 may have negative refractive power, and may have a concave object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 1100 may further include a prism P, an optical path changing element. The prism P may be disposed between lenses of the fixed-focus lens group FLG. For example, the prism P may be disposed between the second lens 1120 and the third lens 1130. The optical imaging system 1100 may include an imaging plane IP. In the embodiment, an imaging plane IP may be formed on the surface of the image sensor IS.

The optical imaging system 1100 may further include a filter IF. The filter IF may be disposed between the variable-focus lens group VLG and an imaging plane IP.

Tables 21 and 22 list lens characteristics and aspheric coefficients of the optical imaging system according to the present embodiment.

TABLE 21

| Surface No. | Elements | Radius of curvature | Thickness/ Distance | Refractive tive Index | Abbe Number |
|---|---|---|---|---|---|
| S1 | First lens | 6.27 | 1.490 | 1.535 | 55.7 |
| S2 | | 2087.86 | 0.150 | | |
| S3 | Second lens | 50.88 | 0.350 | 1.614 | 25.9 |

TABLE 21-continued

| Surface No. | Elements | Radius of curvature | Thickness/ Distance | Refractive Index | Abbe Number |
|---|---|---|---|---|---|
| S4 | | 11.89 | 0.700 | | |
| S5 | | Infinity | 0.600 | | |
| S6 | | Infinity | 0.000 | | |
| S7 | Prism | Infinity | 2.250 | 1.834 | 37.3 |
| S8 | | Infinity | 2.250 | 1.834 | 37.3 |
| S9 | | Infinity | 5.340 | | |
| S10 | | Infinity | 0.000 | | |
| S11 | Third lens | 17.00 | 0.412 | 1.544 | 56.1 |
| S12 | | −11.3718978 | 0.111 | | |
| S13 | Fourth lens | −18.2902446 | 0.300 | 1.639 | 23.5 |
| S14 | | 4.20511441 | 0.181 | | |
| S15 | Fifth lens | 7.625502001 | 0.576 | 1.661 | 20.4 |
| S16 | | −11.3453691 | 0.100 | | |
| S17 | Sixth lens | −12.0708624 | 0.472 | 1.535 | 55.7 |
| S18 | | 14.87120679 | 1.000 | | |
| S19 | Liquid lens | Infinity | 0.200 | 1.550 | 30.0 |
| S20 | | Infinity | 0.700 | 1.333 | 90.0 |
| S21 | | Infinity | 0.100 | 1.550 | 30.0 |
| S22 | | Infinity | 5.000 | | |
| S23 | Filter | Infinity | 0.210 | 1.517 | 64.2 |
| S24 | | Infinity | 2.537 | | |
| S25 | Imaging Plane | Infinity | 0.000 | | |

TABLE 22

| Surface No. | S1 | S2 | S3 | S4 | S11 |
|---|---|---|---|---|---|
| K | 0.0447 | 99.0000 | 99.0000 | 2.2041 | 2.905 |
| A | −4.283E−04 | −3.625E−04 | 3.269E−05 | −4.981E−04 | 2.230E−05 |
| B | −3.439E−05 | −3.039E−05 | −3.628E−05 | −5.555E−05 | −2.218E−04 |
| C | −1.134E−06 | −3.979E−06 | −3.853E−06 | −5.260E−06 | −8.410E−05 |
| D | −4.557E−08 | −4.782E−07 | −3.662E−07 | 2.693E−07 | −5.362E−06 |
| E | −1.083E−09 | −1.168E−08 | −3.545E−08 | 8.377E−09 | −2.757E−06 |
| F | −1.243E−10 | 2.947E−09 | −7.664E−10 | 2.487E−09 | −3.625E−07 |
| G | −1.260E−11 | 4.632E−10 | 1.417E−11 | −5.251E−09 | 2.852E−08 |
| H | −2.714E−12 | 5.543E−11 | 5.300E−11 | 2.904E−10 | 5.632E−09 |
| J | 1.389E−12 | −4.333E−12 | 1.287E−12 | 1.572E−11 | −1.724E−10 |

| Surface No. | S12 | S16 | S17 | S18 |
|---|---|---|---|---|
| K | −81.426 | 43.354 | −92.056 | 3.549 |
| A | 1.047E−03 | −1.160E−03 | −2.017E−03 | 1.847E−03 |
| B | 1.422E−05 | 2.947E−04 | 8.315E−05 | −3.583E−04 |
| C | −8.178E−05 | 5.379E−05 | −3.199E−04 | 1.075E−04 |
| D | −4.668E−05 | 4.710E−05 | −3.354E−04 | −3.007E−04 |
| E | 8.435E−07 | 7.629E−06 | 2.065E−05 | −4.146E−06 |
| F | −1.670E−08 | 1.308E−06 | 5.019E−06 | 3.643E−08 |
| G | −1.185E−09 | 1.133E−07 | 1.683E−08 | 2.470E−06 |
| H | 3.633E−09 | 1.187E−11 | 1.698E−08 | 7.470E−08 |
| J | −5.527E−09 | 6.652E−13 | −6.431E−13 | −3.171E−13 |

Figure 12:
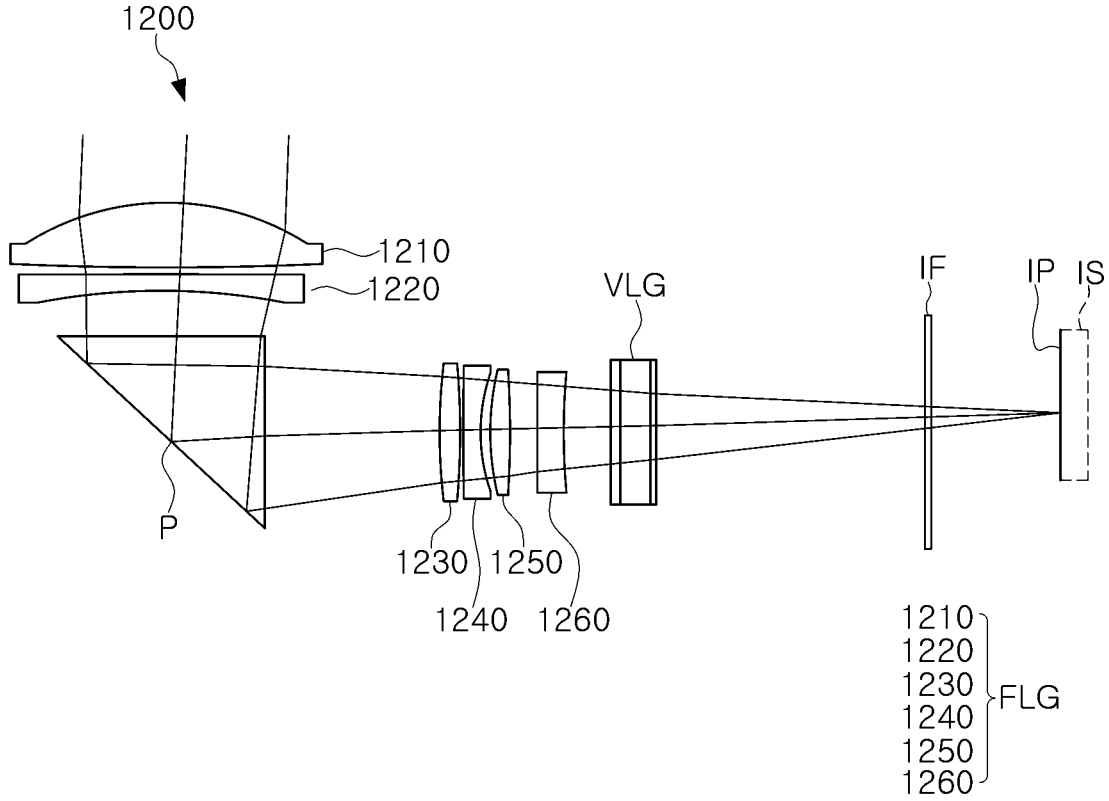
FIG. 12 is a diagram illustrating an optical imaging system according to a twelfth embodiment of the present disclosure.

The optical imaging system according to a twelfth embodiment will be described with reference to FIG. 12.

The optical imaging system 1200 may include a fixed-focus lens group FLG and a variable-focus lens group VLG. The fixed-focus lens group FLG and the variable-focus lens group VLG may be disposed in this order from an object side. For example, the fixed-focus lens group FLG may be disposed in front (an object side) of the variable-focus lens group VLG.

The fixed-focus lens group FLG may include a first lens 1210, a second lens 1220, a third lens 1230, a fourth lens 1240, a fifth lens 1250, and a sixth lens 1260 disposed in this order from an object side. The first lens 1210 may have positive refractive power, and may have a convex object-side surface and a concave image-side surface. The second lens 1220 may have negative refractive power, and may have a convex object-side surface and a concave image-side surface. The third lens 1230 may have positive refractive power, and may have a convex object-side surface and a convex image-side surface. The fourth lens 1240 may have negative refractive power, and may have a concave object-side surface and a concave image-side surface. The fifth lens 1250 may have positive refractive power, and may have a convex object-side surface and a convex image-side surface. The sixth lens 1260 may have negative refractive power, and may have a concave object-side surface and a concave image-side surface.

The variable-focus lens group VLG may include a lens of which an object-side surface or an image-side surface is configured to have a variable radius of curvature. For example, the variable-focus lens group VLG may include a liquid lens VL of which a shape may change. The liquid lens VL may be configured such that the radius of curvature of one surface thereof may be variable. For example, an object-side surface of the liquid lens VL may have a constant shape, but an image-side surface may have a variable shape or a variable radius of curvature. As a specific example, an object-side surface of the liquid lens VL may be planar or may have a constant radius of curvature, but an image-side surface of the liquid lens VL may change from convex to concave (or concave to convex), or the size of the radius of curvature may change without limitation to a predetermined size. Accordingly, the liquid lens VL may have positive refractive power or negative refractive power depending on the shape of the image-side surface, or may have a focal length in a predetermined range depending on the size of the radius of curvature of the image-side surface.

The optical imaging system 1200 may further include a prism P, an optical path changing element. The prism P may be disposed between lenses of the fixed-focus lens group FLG. For example, the prism P may be disposed between the second lens 1220 and the third lens 1230. The optical imaging system 1200 may include an imaging plane IP. In the embodiment, an imaging plane IP may be formed on the surface of the image sensor IS.

The optical imaging system 1200 may further include a filter IF. The filter IF may be disposed between the variable-focus lens group VLG and an imaging plane IP.

Tables 23 and 24 list lens characteristics and aspheric coefficients of the optical imaging system according to the present embodiment.

TABLE 23

| Surface No. | Elements | Radius of curvature | Thickness/ Distance | Refractive Index | Abbe Number |
|---|---|---|---|---|---|
| S1 | First lens | 6.23 | 1.450 | 1.535 | 55.7 |
| S2 | | 5000.00 | 0.100 | | |
| S3 | Second lens | 100.00 | 0.350 | 1.614 | 25.9 |
| S4 | | 13.44 | 0.700 | | |
| S5 | | Infinity | 0.600 | | |
| S6 | | Infinity | 0.000 | | |
| S7 | Prism | Infinity | 2.250 | 1.834 | 37.3 |
| S8 | | Infinity | 2.250 | 1.834 | 37.3 |
| S9 | | Infinity | 3.797 | | |
| S10 | | Infinity | 0.000 | | |
| S11 | Third lens | 25.00 | 0.400 | 1.544 | 56.1 |
| S12 | | −30 | 0.095 | | |
| S13 | Fourth lens | −223.324258 | 0.400 | 1.639 | 23.5 |
| S14 | | 5.415138299 | 0.164 | | |
| S15 | Fifth lens | 7.026666566 | 0.469 | 1.661 | 20.4 |
| S16 | | −1000 | 0.600 | | |
| S17 | Sixth lens | −1000 | 0.585 | 1.535 | 55.7 |
| S18 | | 10.09793156 | 1.000 | | |
| S19 | Liquid lens | Infinity | 0.200 | 1.550 | 30.0 |
| S20 | | Infinity | 0.700 | 1.333 | 90.0 |
| S21 | | Infinity | 0.100 | 1.550 | 30.0 |
| S22 | | Infinity | 6.000 | | |
| S23 | Filter | Infinity | 0.210 | 1.517 | 64.2 |
| S24 | | Infinity | 2.758 | | |
| S25 | Imaging Plane | Infinity | 0.002 | | |

Tables 25 and 26 list optical characteristic values and conditional expression values of the optical imaging systems according to the first to twelfth embodiments.

TABLE 25

| Elements | First embodiment | Second embodiment | Third embodiment | Fourth embodiment | Fifth embodiment | Sixth embodiment |
|---|---|---|---|---|---|---|
| f1 | 12.941 | 11.175 | 11.175 | 10.651 | 10.370 | 10.165 |
| f2 | −19.928 | −13.009 | −13.009 | −12.028 | −8.914 | −7.875 |
| f3 | 16.484 | 11.542 | 11.542 | 13.525 | 8.086 | 7.159 |
| f4 | −8.411 | −9.341 | −9.341 | −10.814 | −9.009 | −8.455 |
| f5 | 28.302 | 166.430 | 166.430 | 130.784 | 779.386 | 328.472 |
| f6 | N/A | N/A | N/A | N/A | N/A | N/A |
| TTL | 28.481 | 27.438 | 26.955 | 27.280 | 27.778 | 27.283 |
| BFL | 10.873 | 14.991 | 14.508 | 15.880 | 16.378 | 16.283 |
| f | 30.900 | 30.900 | 30.900 | 30.900 | 30.901 | 30.600 |
| fA | 30.900 | 30.900 | 30.900 | 30.900 | 30.901 | 30.600 |

| Elements | Seventh embodiment | Eighth embodiment | Ninth embodiment | Tenth embodiment | Eleventh embodiment | Twelfth embodiment |
|---|---|---|---|---|---|---|
| f1 | 9.974 | 9.560 | 10.515 | 11.415 | 11.760 | 11.664 |
| f2 | −7.690 | −7.096 | −20.454 | −24.946 | −25.350 | −25.317 |
| f3 | 7.105 | 6.806 | −25.045 | 39.583 | 12.588 | 25.127 |
| f4 | −8.451 | −8.468 | 18.508 | 17.986 | −5.322 | −8.266 |
| f5 | 272.961 | N/A | −15.851 | −11.083 | 6.986 | 10.562 |
| f6 | N/A | N/A | 131.871 | −26.835 | −12.382 | −18.687 |
| TTL | 27.537 | 28.094 | 25.080 | 25.091 | 25.029 | 25.179 |
| BFL | 16.070 | 18.622 | 8.264 | 9.543 | 7.747 | 8.970 |
| f | 30.257 | 30.540 | 27.000 | 27.006 | 27.009 | 27.010 |
| fA | 30.257 | 30.540 | 27.000 | 27.006 | 27.009 | 27.010 |

TABLE 24

| Surface No. | S1 | S2 | S3 | S4 | S11 |
|---|---|---|---|---|---|
| K | 1.380E−01 | 9.900E+01 | 9.900E+01 | 3.543E+00 | 2.905E+00 |
| A | −4.989E−04 | −6.202E−04 | −2.023E−04 | −5.151E−04 | 3.115E−04 |
| B | −4.675E−05 | −3.731E−05 | −4.837E−05 | −7.577E−05 | 1.266E−04 |
| C | −1.617E−06 | −3.767E−06 | −4.405E−06 | −8.383E−06 | 3.604E−05 |
| D | −8.245E−08 | −3.856E−07 | −4.549E−07 | −3.265E−08 | −8.009E−06 |
| E | 2.147E−09 | 2.160E−09 | −3.735E−08 | −4.546E−09 | −3.216E−08 |
| F | 3.474E−10 | 3.742E−09 | −1.030E−09 | 2.538E−09 | −3.307E−07 |
| G | 3.451E−11 | 5.248E−10 | −4.019E−11 | −5.165E−09 | 2.852E−08 |
| H | 1.551E−12 | 5.530E−11 | 5.163E−11 | 2.972E−10 | 5.632E−09 |
| J | 1.769E−12 | −5.216E−12 | 3.630E−13 | 1.154E−11 | −1.724E−10 |

| Surface No. | S12 | S16 | S17 | S18 |
|---|---|---|---|---|
| K | −84.251 | 99.000 | −92.056 | −32.340 |
| A | 2.679E−03 | −4.373E−03 | −5.576E−03 | 1.381E−03 |
| B | 6.280E−05 | −2.064E−05 | 4.598E−04 | 4.641E−05 |
| C | −1.221E−04 | 3.356E−04 | 3.756E−04 | 1.934E−04 |
| D | −2.024E−05 | | −1.730E−04 | −1.522E−04 |
| E | | | 1.782E−05 | 3.721E−06 |
| F | | | 5.019E−06 | 3.643E−08 |
| G | | | 1.683E−08 | 2.470E−06 |
| H | | | 1.698E−08 | 7.470E−08 |
| J | | | −6.431E−13 | −3.171E−13 |

TABLE 26

| Conditional expressions | First embodiment | Second embodiment | Third embodiment | Fourth embodiment | Fifth embodiment | Sixth embodiment |
|---|---|---|---|---|---|---|
| V1-V2 | 29.696 | 31.764 | 31.764 | 31.764 | 32.149 | 32.149 |
| fA | 30.900 | 30.900 | 30.900 | 30.900 | 30.901 | 30.600 |
| TTL | 28.481 | 27.438 | 26.955 | 27.280 | 27.778 | 27.283 |
| TTL/f | 0.922 | 0.888 | 0.872 | 0.883 | 0.899 | 0.892 |
| TTL/f1 | 2.201 | 2.455 | 2.412 | 2.561 | 2.679 | 2.684 |
| TTL/f2 | −1.429 | −2.109 | −2.072 | −2.268 | −3.116 | −3.464 |

| Conditional expressions | Seventh embodiment | Eighth embodiment | Ninth embodiment | Tenth embodiment | Eleventh embodiment | Twelfth embodiment |
|---|---|---|---|---|---|---|
| V1-V2 | 32.482 | 32.482 | 29.799 | 29.799 | 29.799 | 29.799 |
| fA | 30.257 | 30.540 | 27.000 | 27.006 | 27.009 | 27.010 |
| TTL | 27.537 | 28.094 | 25.080 | 25.091 | 25.029 | 25.179 |
| TTL/f | 0.910 | 0.920 | 0.929 | 0.929 | 0.927 | 0.932 |
| TTL/f1 | 2.761 | 2.939 | 2.385 | 2.198 | 2.128 | 2.159 |
| TTL/f2 | −3.581 | −3.959 | −1.226 | −1.006 | −0.987 | −0.995 |

Figure 13:
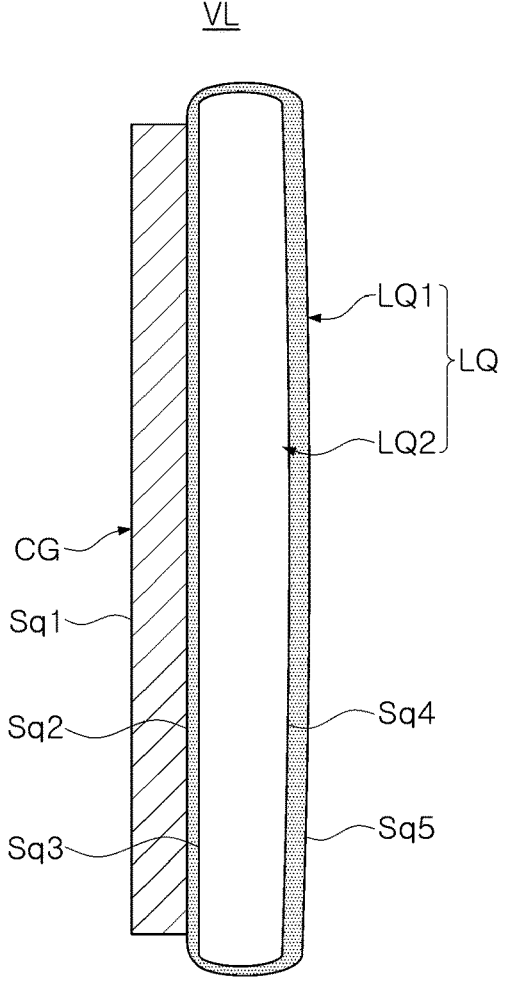
FIG. 13 is a diagram illustrating a variable-focus lens according to an embodiment of the present disclosure.

In the description below, an embodiment of a liquid lens included in a variable-focus lens group will be described with reference to FIG. 13.

The liquid lens VL according to the embodiment may be configured to have predetermined refractive power. For example, the liquid lens VL may have positive or negative refractive power. The liquid lens VL may include a support member CG and deformable members LQ1 and LQ2 (LQ). The support member CG may be configured to allow light to pass therethrough, to support one surface of the liquid lens VL, and have an object-side surface Sq1. For example, the support member CG may be formed of transparent glass through which light may easily pass. The deformable members LQ1 and LQ2 may be formed of a material which may be deformed by an external signal. For example, at least one of the first deformable member LQ1 and the second deformable member LQ2 may be formed of a material which may be reduced or expanded by an applied current. The first deformable member LQ1 may be configured to surround the surface of the second deformable member LQ2. For example, the first deformable member LQ1 may be configured to cover an object-side surface and an image-side surface of the second deformable member LQ2. The first deformable member LQ1 and the second deformable member LQ2 may be configured to have different refractive indexes and Abbe numbers. For example, the refractive index of the second deformable member LQ2 may be smaller than that of the first deformable member LQ1, and the Abbe number of the second deformable member LQ2 may be greater than that of the first deformable member LQ1. The first deformable member LQ1 and the second deformable member LQ2 may be configured to have substantially the same or similar strain rate. In other words, an image-side surface Sq4 of the second deformable member LQ2 may be deformed to have substantially the same radius of curvature as that of an image-side surface Sq5 of the first deformable member LQ1.

One surface of the liquid lens VL may be configured to be flat. For example, object-side surfaces Sq2 and Sq3 of the liquid lens VL may have a flat shape by the support member CG as illustrated in FIG. 13. However, the object-side surfaces of the liquid lens VL may not be formed in a flat shape. For example, the object-side surface of the liquid lens VL may be deformed into a convex or concave shape depending on the shape of the support member CG.

One surface of the liquid lens VL may be configured to be convex or concave. For example, an image-side surface of the liquid lens VL may be convex as illustrated in FIG. 13. However, the image-side surface of the liquid lens VL may not be configured to be convex. For example, the image-side surface of the liquid lens VL may be concave depending on the state of the deformable members LQ1 and LQ2.

Since the shape of the image-side surface of the liquid lens VL configured as above may be changed to be convex or concave or the radius of curvature of the image-side surface may be changed depending on the amount of energy applied to the deformable members LQ1 and LQ2, the focus of the optical imaging systems 100, 200, 300, 400, 500, 600, 700, 800, 900, 1000, 1100, and 1200 may be finely adjusted (AF) or changed (zooming).

Figure 14:
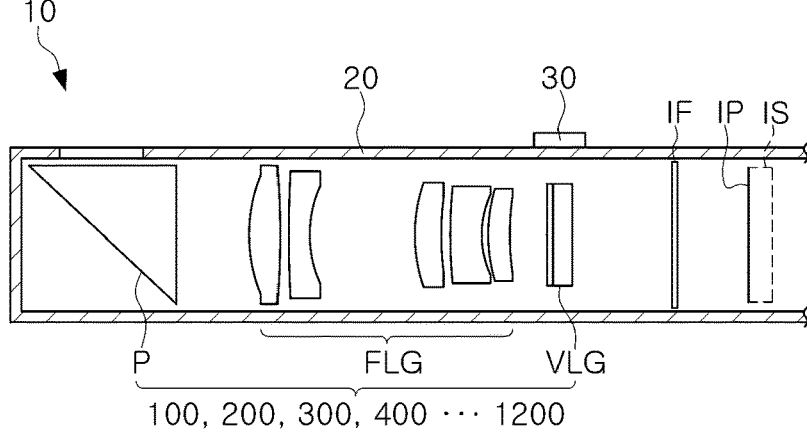
FIG. 14 is a diagram illustrating a camera module according to an embodiment of the present disclosure.

In the description below, a camera module including an optical imaging system according to an embodiment will be described with reference to FIG. 14.

The camera module 10 according to an embodiment may include the housing 20 and the optical imaging systems 100, 200, 300, 400, 500, 600, 700, 800 900, 1000, 1100, and 1200 according to the first to twelfth embodiments described above. The optical imaging system may be one of the optical imaging systems 100, 200, 300, 400, 500, 600, 700, 800, 900, 1000, 1100, and 1200 according to the aforementioned embodiments. The camera module 10 may include a component for supplying energy to the variable-focus lens group VLG. For example, the camera module 10 may include an energy generator 30 for supplying energy required for operation of the variable-focus lens group VLG. The energy generating device 30 may be configured to generate thermal energy, vibration energy, electrical energy, and the like.

The camera module 10 may be configured to enable an autofocusing function (AF). For example, the camera module 10 may perform an AF function by applying energy to the variable-focus lens group VLG included in the optical imaging system 100, 200, 300, 400, 500, 600, 700, 800, 900, 1000, 1100, and 1200. Accordingly, in the camera module 10 according to the present embodiment, a driving device for driving the fixed-focus lens group FLG in the optical axis direction may not be provided.

According to the aforementioned embodiments, since the optical imaging system may have an adjustable focal length, the size and weight of the camera module may be reduced.

Also, the camera module including the optical imaging system of the embodiment may perform an AF function through the shape change of the variable-focus lens, such that the focus of the camera module may be swiftly adjusted and a driving current required for the AF function of the camera module may be reduced.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a fixed-focus lens group and a variable-focus lens group disposed in this order from an object side,
wherein the fixed-focus lens group includes a first lens having positive refractive power, a second lens having negative refractive power, a third lens having positive refractive power, a fourth lens having negative refractive power, and a fifth lens having positive refractive power disposed in this order from an object side,
wherein the fixed-focus lens group has a total number of five lenses with refractive power, and
wherein the second lens has a concave image-side surface.

2. The optical imaging system of claim 1, wherein the first lens has a convex object-side surface.

3. The optical imaging system of claim 1, wherein the third lens has a convex object-side surface.

4. The optical imaging system of claim 1, further comprising:
an optical path changing element disposed on an object side of the fixed-focus lens group or between lenses of the fixed-focus lens group.

5. The optical imaging system of claim 1, wherein the fourth lens has a concave image-side surface.

6. The optical imaging system of claim 1, wherein at least one of conditional expressions as below is satisfied:

$$2.0 < TTL/f1 < 4.0, \text{ and}$$

$$-5.0 < TTL/f2 < -0.2,$$

where TTL is a distance from an object-side surface of the first lens to an imaging plane of the optical imaging system, f1 is a focal length of the first lens, and f2 is a focal length of the second lens.

7. The optical imaging system of claim 1, wherein a conditional expression as below is satisfied:

$$25 < V1 - V2,$$

where V1 is an Abbe number of the first lens, and V2 is an Abbe number of the second lens.

8. A camera module comprising:
a housing; and
the optical imaging system of claim 1 disposed in the housing.

9. An optical imaging system, comprising:
a fixed-focus lens group; and
a variable-focus lens group disposed on an image side of the fixed-focus lens group,
wherein the fixed-focus lens group includes a first lens having positive refractive power, a second lens having negative refractive power, a third lens having positive refractive power, a fourth lens having negative refractive power, and a fifth lens having positive refractive power disposed in this order from an object side, wherein the fixed-focus lens group has a total number of five lenses with refractive power, and
wherein a conditional expression as below is satisfied:

$$0.8 < TTL/f < 1.0,$$

where TTL is a distance from an object-side surface of the first lens to an imaging plane of the optical imaging system, and f is a focal length of the optical imaging system.

10. The optical imaging system of claim 9, wherein a conditional expression as below is satisfied:

$$28.0 \text{ mm} < fA < 36.0 \text{ mm},$$

where fA is a focal length of the fixed-focus lens group.

11. The optical imaging system of claim 9, wherein a conditional expression as below is satisfied:

$$-600 \text{ mm} < fB < 20.0 \text{ mm},$$

where fB is a focal length of the variable-focus lens group.

12. The optical imaging system of claim 9, further comprising:
an optical path changing element disposed on an object side of the fixed-focus lens group or between lenses of the fixed-focus lens group.

13. A camera module comprising:
a housing; and
the optical imaging system of claim 9 disposed in the housing.

14. An optical imaging system, comprising:
a fixed-focus lens group and a variable-focus lens group disposed in this order from an object side,
wherein the fixed-focus lens group includes a first lens having positive refractive power, a second lens having negative refractive power, a third lens having positive refractive power, a fourth lens having negative refractive power, and a fifth lens having positive refractive power disposed in this order from an object side,
wherein the fixed-focus lens group has a total number of five lenses with refractive power,
wherein the second lens has a concave image-side surface, and
wherein at least one of conditional expressions as below is satisfied:

$$28.0 \text{ mm} < fA < 36.0 \text{ mm, and}$$

$$-600 \text{ mm} < fB < 20.0 \text{ mm},$$

where fA is a focal length of the fixed-focus lens group and fB is a focal length of the variable-focus lens group.

15. A camera module comprising:
a housing;
the optical imaging system of claim 14 disposed in the housing; and
an energy generator configured to supply energy to operate the variable-focus lens group.

* * * * *